United States Patent
Li

(10) Patent No.: US 12,425,272 B2
(45) Date of Patent: Sep. 23, 2025

(54) CHANNEL ESTIMATION METHOD AND APPARATUS, COMMUNICATION DEVICE, AND STORAGE MEDIUM

(71) Applicant: Beijing Xiaomi Mobile Software Co., Ltd., Beijing (CN)

(72) Inventor: Yuanyuan Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 420 days.

(21) Appl. No.: 18/025,096

(22) PCT Filed: Sep. 11, 2020

(86) PCT No.: PCT/CN2020/114907
§ 371 (c)(1),
(2) Date: Mar. 7, 2023

(87) PCT Pub. No.: WO2022/052073
PCT Pub. Date: Mar. 17, 2022

(65) Prior Publication Data
US 2023/0327915 A1 Oct. 12, 2023

(51) Int. Cl.
*H04L 25/02* (2006.01)
(52) U.S. Cl.
CPC .................. *H04L 25/0224* (2013.01)
(58) Field of Classification Search
CPC .................................................. H04L 25/0224
See application file for complete search history.

(56) References Cited

U.S. PATENT DOCUMENTS

| 8,665,910 | B2* | 3/2014 | Haustein | H04L 5/0051 370/324 |
| 2014/0177584 | A1* | 6/2014 | Ouchi | H04W 52/18 370/329 |
| 2016/0373226 | A1* | 12/2016 | Wang | H04L 27/2601 |
| 2017/0289924 | A1 | 10/2017 | Fu et al. | |
| 2019/0327689 | A1 | 10/2019 | Fu et al. | |
| 2020/0084592 | A1 | 3/2020 | Gulati et al. | |
| 2022/0407662 | A1* | 12/2022 | Gong | H04L 5/0048 |

(Continued)

FOREIGN PATENT DOCUMENTS

| CN | 102202027 A | 9/2011 |
| CN | 106059733 A | 10/2016 |
| CN | 106559363 A | 4/2017 |

(Continued)

OTHER PUBLICATIONS

Chinese Office Action issued on Jul. 24, 2023 for Chinese Patent Application No. 202080002239.6.

*Primary Examiner* — Zhiren Qin
(74) *Attorney, Agent, or Firm* — Volpe Koenig

(57) ABSTRACT

Provided by an example of the disclosure is a channel estimation method, the method being applied by a sending end and including: sending demodulation reference signals (DMRSs) on a comb resource; where after the demodulation reference signals (DMRSs) transmitted on different frequency bands of the comb resource are transformed to a time domain, pilot sequences that are equivalent are obtained; and signal energy of the plurality of equivalent pilot sequences is superposed, and is then used for channel estimation of a wireless transmission channel.

20 Claims, 22 Drawing Sheets

(56) References Cited

U.S. PATENT DOCUMENTS

2023/0344583 A1* 10/2023 Yi ........................ H04L 5/0053

FOREIGN PATENT DOCUMENTS

| | | |
|---|---|---|
| CN | 107294674 A | 10/2017 |
| CN | 108111273 A | 6/2018 |
| CN | 108289018 A | 7/2018 |
| CN | 108400848 A | 8/2018 |
| CN | 108566266 A | 9/2018 |
| CN | 108886448 A | 11/2018 |
| CN | 109150472 A | 1/2019 |
| CN | 109391387 A | 2/2019 |
| CN | 110166194 A | 8/2019 |
| CN | 111431686 A | 7/2020 |
| CN | 111586873 A | 8/2020 |
| WO | 2019074408 A1 | 4/2019 |

* cited by examiner

CHANNEL ESTIMATION METHOD AND APPARATUS, COMMUNICATION DEVICE, AND STORAGE MEDIUM

CROSS REFERENCE TO RELATED APPLICATION

The present application is a U.S. National Stage of International Application No. PCT/CN2020/114907, filed on Sep. 11, 2020, the contents of all of which are incorporated herein by reference in their entireties for all purposes.

BACKGROUND

Since wireless signal coverage directly affects quality of service and operating cost of wireless communication, when an operator commercializes a cellular network, wireless signal coverage is one of key factors to be considered. Compared with a long term evolution (LTE) network, a working frequency of a new radio (NR) network is much higher, such as 28 GHz or 39 GHz of a frequency 2 (FR2). Moreover, many countries are providing more frequencies for frequency 1 (FR1), such as 3.5 GHz. The working frequency of the new radio (NR) network is usually higher than that of the long term evolution (LTE) network or 3G network.

SUMMARY

The disclosure relates to, but is not limited to the technical field of wireless communications, in particular to a channel estimation method and apparatus, a communication device, and a storage medium.

An example of the disclosure discloses a channel estimation method, applied by a sending end, and including: sending a demodulation reference signal (DMRS) on a comb resource, where after the DMRS transmitted on different frequency bands of the comb resource is transformed to a time domain, pilot sequences that are equivalent are obtained; and signal energy of the plurality of equivalent pilot sequences is superposed, and is then used for channel estimation of a wireless transmission channel.

According to a second aspect of an example of the disclosure, a channel estimation method is provided, applied by a receiving end, and including: receiving DMRS respectively on different frequency bands of a comb resource; obtaining pilot signals in a time domain by transforming the received DMRS from a frequency domain to the time domain; superposing signal energy of the plurality of equivalent pilot signals in the time domain; and performing channel estimation of a wireless transmission channel according to a superposed signal energy.

According to a third aspect of an example of the disclosure, a communication device is provided, including: a processor; and a memory for storing executable instructions of the processor. Where the processor is configured to: implement the method described in any example of the disclosure when running the executable instructions.

According to a fourth aspect of an example of the disclosure, a computer storage medium is provided. The computer storage medium stores a computer executable program. The executable program, when executed by a processor, implements the method described in any example of the disclosure.

DETAILED DESCRIPTION

Figure 1:
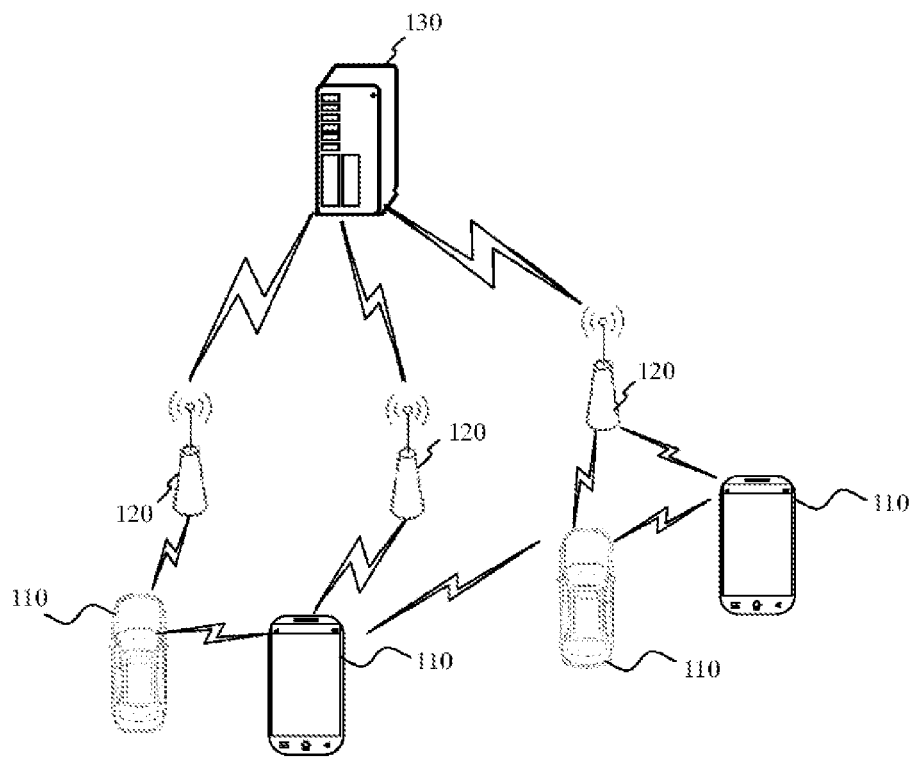
FIG. 1 is a schematic structural diagram of a wireless communication system.

Examples will be illustrated in detail here, and instances of which are represented in accompanying drawings. When the following description refers to the accompanying drawings, the same number in the different accompanying drawings represents the same or similar elements unless otherwise indicated. The implementations described in the following examples do not represent all implementations consistent with the examples of the disclosure. On the contrary, they are merely examples of an apparatus and method consistent with some aspects of the examples of the disclosure as detailed in the appended claims.

The terms used in the examples of the disclosure are merely for the purpose of describing the particular examples, and are not intended to limit the examples of the disclosure.

The singular forms "a" and "the" used in the examples of the disclosure and the appended claims are intended to include the plural forms as well, unless the context clearly indicates other meanings. It should be further understood that the term "and/or" used here refers to and contains any and all possible combinations of one or more associated listed items.

It should be understood that the terms "first", "second", "third" and the like may be employed in the examples of the disclosure to describe various information, but this information should not be limited to these terms. These terms are merely used to distinguish the same type of information from one another. For example, in a case of not departing from the scope of the examples of the disclosure, first information may also be called second information, and similarly, the second information may also be called the first information. Depending on the context, the word "if" as used here may be interpreted as "at the time of" or "when" or "in response to determining".

For the purpose of conciseness and easy understanding, the terms used here when representing a size relationship are "greater than" or "less than". However, for those skilled in the art, it may be understood that the term "greater than" also covers the meaning of "greater than or equal to", and "less than" also covers the meaning of "less than or equal to".

Since wireless signal coverage directly affects quality of service and operating cost of wireless communication, when an operator commercializes a cellular network, wireless signal coverage is one of key factors to be considered. Compared with a long term evolution (LTE) network, a working frequency of a new radio (NR) network is much higher, such as 28 GHz or 39 GHz of a frequency 2 (FR2). Moreover, many countries are providing more frequencies for frequency 1 (FR1), such as 3.5 GHz. The working frequency of the new radio (NR) network is usually higher than that of the long term evolution (LTE) network or 3G network. Because the higher working frequency is adopted, a wireless channel will inevitably have higher path loss. The higher path loss will lead to poor wireless signal coverage, and the quality of service of wireless communication cannot be guaranteed.

FIG. 1 shows a schematic structural diagram of a wireless communication system provided by an example of the disclosure. As shown in FIG. 1, the wireless communication system is a communication system based on a cellular mobile communication technology, and the wireless communication system may include: a plurality of user equipment 110 and a plurality of base stations 120.

The user equipment 110 may refer to a device that provides voice and/or data connectivity for a user. The user equipment 110 may communicate with one or more core networks via a radio access network (RAN), and the user equipment 110 may be Internet of Thing user equipment, such as a sensor device, a mobile phone (or called a "cellular" phone) and a computer with the Internet of Thing user equipment, for example, may be fixed, portable, pocket-sized, hand-held, computer built-in or vehicle-mounted apparatuses. For example, the user equipment may be a station (STA), a subscriber unit, a subscriber station, a mobile station, a mobile, a remote station, an access point, remote user equipment (remote terminal), access user equipment (access terminal), a user apparatus (user terminal), a user agent, a user device, or the user equipment. Alternatively, the user equipment 110 may also be a device of an unmanned aerial vehicle. Alternatively, the user equipment 110 may also be a vehicle-mounted device, for example, a trip computer with a wireless communication function, or wireless user equipment externally connected to the trip computer. Alternatively, the user equipment 110 may also be a roadside device, for example, may be a streetlight, a signal light, or other roadside devices with the wireless communication function.

The base station 120 may be a network-side device in the wireless communication system. The wireless communication system may be the 4th generation mobile communication (4G) system, also known as a long term evolution (LTE) system; alternatively, the wireless communication system may also be a 5G system, also known as a new radio system or a 5G NR system. Alternatively, the wireless communication system may also be the next-generation system of the 5G system. An access network in the 5G system may be called a new generation-radio access network (NG-RAN).

The base station 120 may be an evolved base station (eNB) employed in the 4G system. Alternatively, the base station 120 may also be a base station (gNB) that employs a centralized distributed architecture in the 5G system. In response to determining that the base station 120 employs the centralized distributed architecture, the base station usually includes a central unit (CU) and at least two distributed units (DU). The central unit is provided with protocol stacks of a packet data convergence protocol (PDCP) layer, a radio link control (RLC) protocol layer, and a media access control (MAC) layer; and the distributed unit is provided with a physical (PHY) layer protocol stack. The specific implementation of the base station 120 is not limited in the examples of the disclosure.

A wireless connection may be established between the base station 120 and the user equipment 110 through a wireless radio. In different implementations, the wireless radio is a wireless radio based on the 4th generation mobile communication network technology (4G) standard; alternatively, the wireless radio is a wireless radio based on the 5th generation mobile communication network technology (5G) standard, for example, the wireless radio is a new radio. Alternatively, the wireless radio may also be a wireless radio based on the next generation mobile communication network technology standard of 5G.

In some examples, an end to end (E2E) connection may also be established between the user equipment 110, for example, vehicle to vehicle (V2V) communication, vehicle to infrastructure (V2I) communication, vehicle to pedestrian (V2P) communication and other scenarios in vehicle to everything (V2X) communication.

Here, the above user equipment may be regarded as terminal equipment of the following examples.

In some examples, the above wireless communication system may further contain a network management device 130.

The plurality of base stations 120 are respectively connected with the network management device 130. The network management device 130 may be a core network device in the wireless communication system. For example, the network management device 130 may be a mobility management entity (MME) in an evolved packet core (EPC) network. Alternatively, the network management device may also be other core network devices, such as a serving gateway (SGW), a public data network gateway (PGW), a policy and charging rules function (PCRF) unit or a home subscriber server (HSS). An implementation form of the network management device 130 is not limited in the examples of the disclosure.

In order to facilitate understanding of any example of the disclosure, a processing process of channel estimation is illustrated first.

In one example, the processing process of channel estimation of a channel includes: when sending data, a sending end will insert a pilot sequence in the data. Here, the data may be user face data or control face data. A receiving end may calculate to obtain a transmission condition of a channel according to the received pilot sequence and a stored pilot sequence sent by the sending end. According to the transmission condition, a wireless communication system may be assisted in obtaining a channel transmission condition of the data part. After signal demodulation is performed according to the channel transmission condition, data content sent by the sending end may be obtained. An impulse response of the channel may be obtained by dividing the pilot sequence received by the receiving end and the pilot sequence sent by the sending end and stored by the receiving end. This processing process is called channel estimation.

In a new radio (NR) system, a demodulation reference signal (DMRS) is designed to assist the new radio (NR) system to obtain a channel estimation value. In one example, the new radio (NR) system supports two types of demodulation reference signals (DMRSs). In one example, the type of demodulation reference signal (DMRS) used may be configured by a high-level signaling. Here, the high-level signaling may be a radio resource control (RRC) signaling. The demodulation reference signal (DMRS) corresponding to each type of new radio (NR) may include a single-symbol demodulation reference signal (DMRS) and a double-symbol demodulation reference signal (DMRS). The single-symbol demodulation reference signal (DMRS) occupies one orthogonal frequency division multiplexing (OFDM) symbol. The double-symbol demodulation reference signal (DMRS) occupies the two orthogonal frequency division multiplexing (OFDM) symbols. Multiplexing and configuration modes of the two types of demodulation reference signals (DMRS) are specifically described as follows.

Figure 2A:
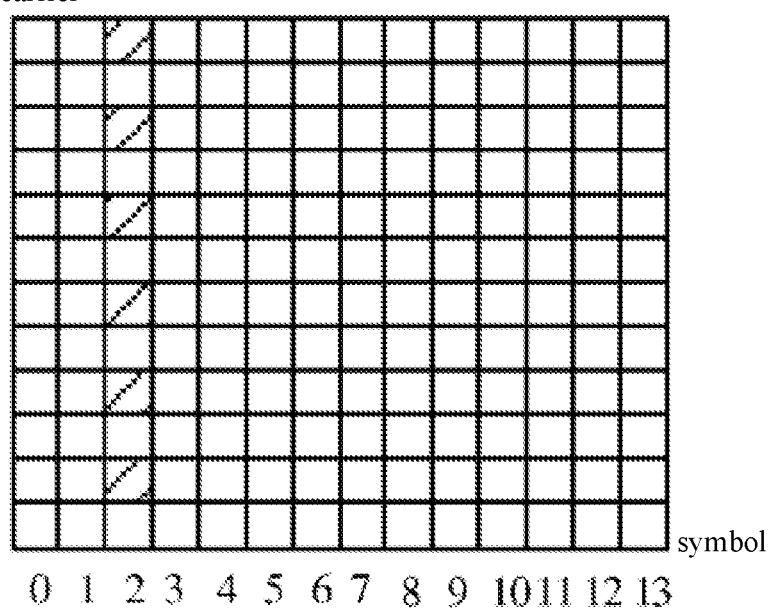
FIG. 2a is a schematic diagram of a time-frequency domain resource shown according to an example.
Figure 2B:
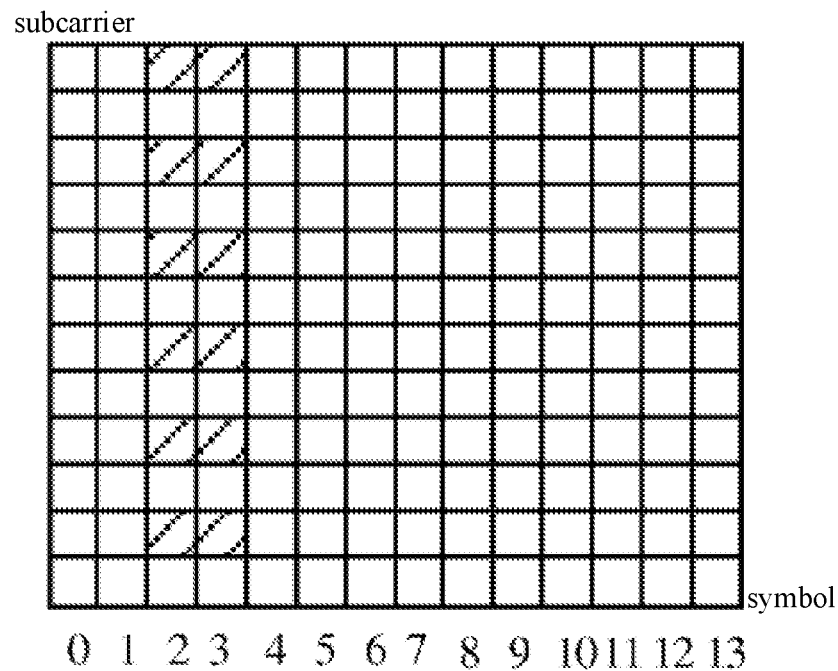
FIG. 2b is a schematic diagram of a time-frequency domain resource shown according to an example.

In one example, corresponding to the first type of demodulation reference signal (DMRS), please refer to FIG. 2a. For the single-symbol demodulation reference signal (DMRS), subcarriers in one orthogonal frequency division multiplexing (OFDM) symbol are divided into two groups of frequency-division comb resources. Each group of comb resources constitutes a code division multiplexing (CDM) group. The code division multiplexing (CDM) group supports multiplexing of two ports inside through two orthogonal cover codes (OCC), and supports multiplexing of up to four ports. Please refer to FIG. 2b, the double-symbol demodulation reference signal (DMRS) adds the orthogonal codes (OCC) in a time domain on the basis of a single-symbol demodulation reference signal (DMRS) structure. Each group of comb resources occupies two consecutive orthogonal frequency division multiplexing (OFDM) symbols. Each code division multiplexing (CDM) group realizes orthogonality of the four ports through four orthogonal cover codes (OCC) in the time domain. Thus, up to eight orthogonal ports are supported.

Figure 3A:
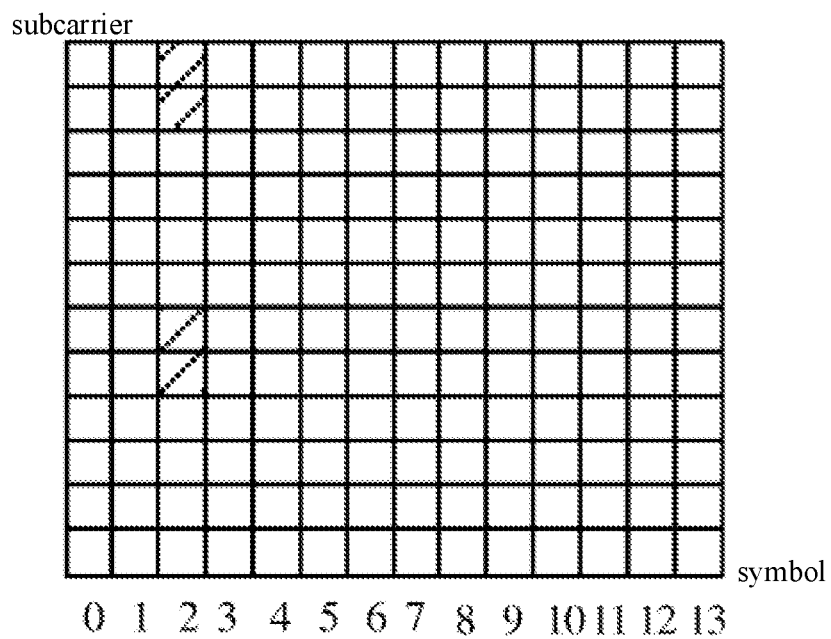
FIG. 3a is a schematic diagram of a time-frequency domain resource shown according to an example.
Figure 3B:
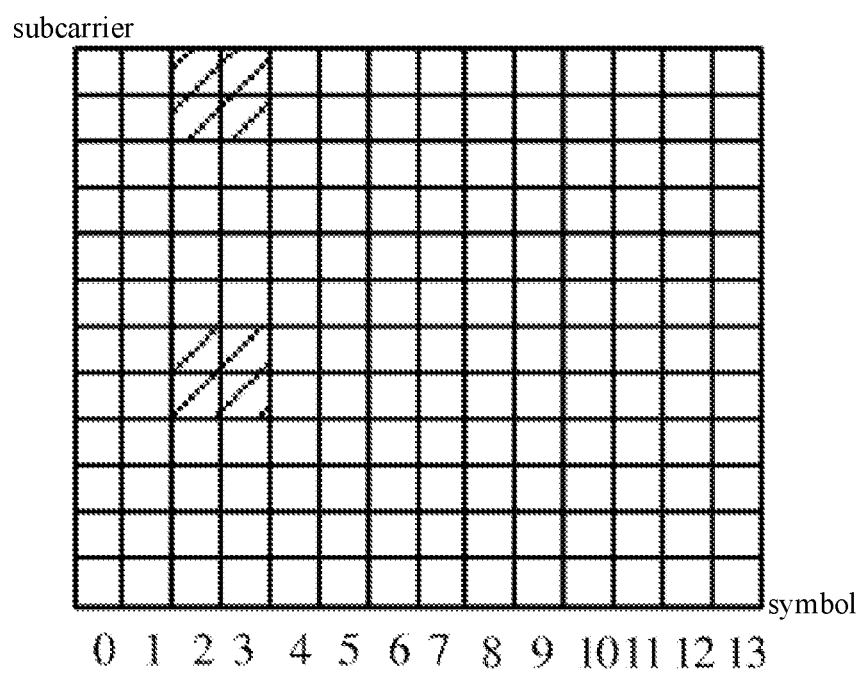
FIG. 3b is a schematic diagram of a time-frequency domain resource shown according to an example.

In one example, corresponding to the second type of demodulation reference signal (DMRS), please refer to FIG. 3a. For the single-symbol demodulation reference signal (DMRS), the subcarriers in one orthogonal frequency division multiplexing (OFDM) symbol are divided into three code division multiplexing (CDM) groups. Each code division multiplexing (CDM) group is composed of two pairs of two adjacent subcarriers. The code division multiplexing (CDM) group supports multiplexing of two ports inside through the two orthogonal cover codes (OCC), and thus supports up to six ports. Please refer to FIG. 3b, the double-symbol demodulation reference signal (DMRS) adds the orthogonal cover code (OCC) on the basis of a single-symbol structure. Each code division multiplexing (CDM) group occupies the two consecutive orthogonal frequency division multiplexing (OFDM) symbols. Up to twelve ports are supported in the three code division multiplexing (CDM) groups.

In one example, the channel estimation value is obtained by employing the demodulation reference signal (DMRS). When the demodulation reference signal (DMRS) issued by a terminal at a signal coverage edge of a cell arrives at a base station side or when the signal path loss between the terminal and the base station is large, receiving power will be very low, and the accurate channel estimation cannot be obtained by utilizing the weak demodulation reference signal (DMRS), resulting in inaccurate data demodulation.

Figure 4:
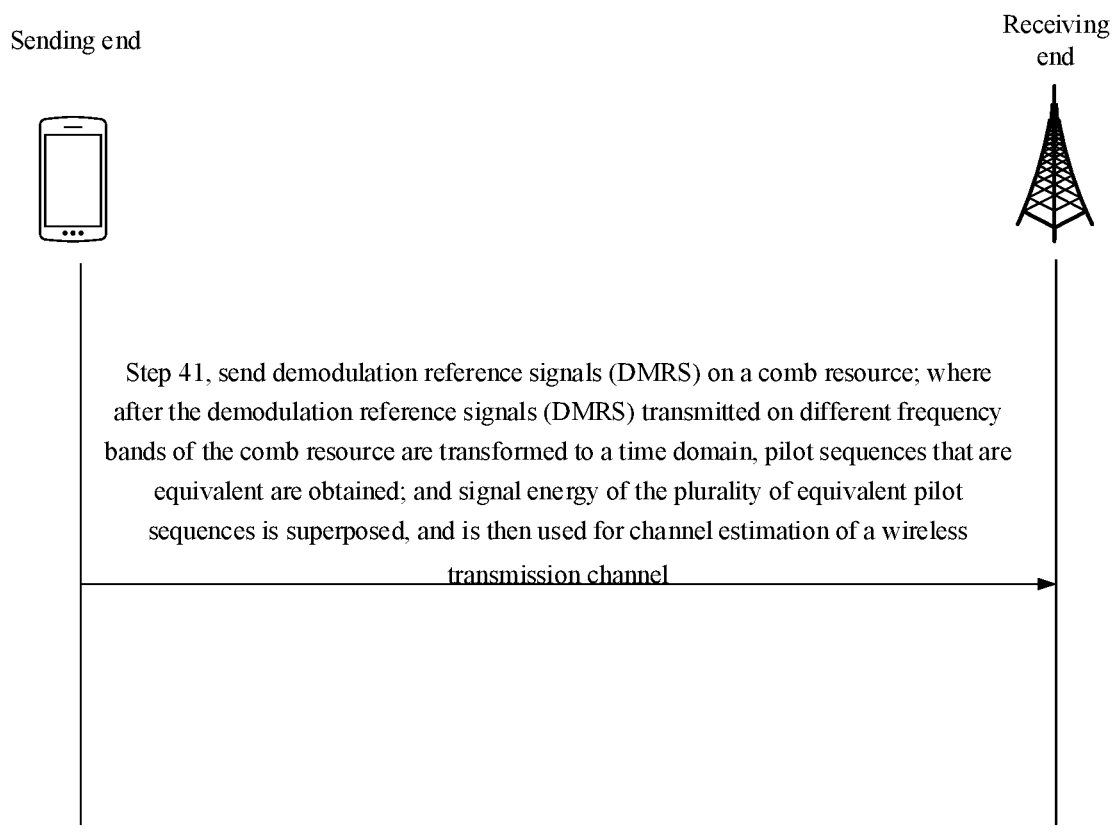
FIG. 4 is a flow diagram of a channel estimation method shown according to an example.

As shown in FIG. 4, the present example provides a channel estimation method, applied by a sending end, and including step 41.

In step 41, demodulation reference signals (DMRSs) are sent on a comb resource, where after the demodulation reference signals (DMRSs) transmitted on different frequency bands of the comb resource are transformed to a time domain, pilot sequences that are equivalent are obtained; and signal energy of the plurality of equivalent pilot sequences is superposed, and is then used for channel estimation of a wireless transmission channel.

In one example, the sending end may be a terminal, and a receiving end receiving the demodulation reference signals (DMRSs) may be a base station. In another example, the sending end may be the base station, and the receiving end receiving the demodulation reference signals (DMRSs) may be the terminal.

The terminal may be, but is not limited to, a mobile phone, a wearable device, a vehicle-mounted terminal, a road side unit (RSU), a smart home terminal, an industrial sensing device and/or a medical device, and the like.

The base station is an interface device for the terminal to access a network. The base station may be various types of base stations, such as a base station of the 3th generation mobile communication (3G) network, a base station of the 4th generation mobile communication (4G) network, a base station of the 5th generation mobile communication (5G) network or other evolved base stations.

Here, channel estimation of the wireless transmission channel may be channel estimation of various channels such as a physical uplink control channel (PUCCH), a physical uplink shared channel (PUSCH), a physical downlink control channel (PDCCH), and a physical downlink shared channel (PDSCH).

In one example, when the sending end sends uplink data to the receiving end, the sending end needs to send the pilot sequence, so that the receiving end performs channel estimation of the wireless transmission channel according to the received pilot sequence to obtain a channel estimation result, and utilizes the channel estimation result to complete decoding of the received uplink data. Here, the pilot sequence may be sent through the demodulation reference signals (DMRSs).

In one example, the comb resource may be at least one frequency band distributed within the same or plurality of orthogonal frequency division multiplexing (OFDM) symbols; different frequency bands have the same subcarrier spacing; and each frequency band may contain one resource element (RE) or the plurality of adjacent resource elements (REs).

In one example, the comb resource is at least one frequency band distributed within one orthogonal frequency division multiplexing (OFDM) symbol. Please refer to FIG. 2a again. Each row in FIG. 2a represents one subcarrier, and each column represents one orthogonal frequency division multiplexing (OFDM) symbol. The comb resource is set in the second orthogonal frequency division multiplexing (OFDM) symbol, and the corresponding subcarriers are the first, third, fifth, seventh, ninth and eleventh subcarriers respectively. In one example, the demodulation reference signals (DMRSs) may be sent on the second orthogonal frequency division multiplexing (OFDM) symbol and on the first, third, fifth, seventh, ninth and eleventh subcarriers. That is, each frequency band corresponds to one resource element (RE), and the comb resource occupies a total of six resource elements (REs).

In one example, the comb resource is at least one frequency band distributed within the plurality of orthogonal frequency division multiplexing (OFDM) symbols. Here, the plurality of orthogonal frequency division multiplexing (OFDM) symbols may be orthogonal frequency division multiplexing (OFDM) symbols adjacent in the time domain. Please refer to FIG. 2b again, the comb resource is set in the second orthogonal frequency division multiplexing (OFDM) symbol and the third orthogonal frequency division multiplexing (OFDM) symbol, and the corresponding subcarriers are the first, third, fifth, seventh, ninth and eleventh subcarriers respectively. That is, each frequency band corresponds to the two resource elements (REs), and the comb resource occupies a total of twelve resource elements (REs).

In one example, the comb resource may be divided into a plurality of code division multiplexing (CDM) groups. The demodulation reference signals (DMRSs) may be sent on resources contained in one code division multiplexing (CDM) group. Here, among the plurality of code division multiplexing (CDM) groups, a code division multiplexing (CDM) group to which the resource of sending the demodulation reference signals (DMRSs) belongs is a first code division multiplexing (CDM) group. Among the plurality of code division multiplexing (CDM) groups, other code division multiplexing (CDM) groups other than the second code division multiplexing (CDM) group are second code division multiplexing (CDM) groups. Here, there may be the plurality of second code division multiplexing (CDM) groups.

In one example, the sending end may select to send the demodulation reference signals (DMRSs) on the resource of any code division multiplexing (CDM) group.

In one example, please refer to FIG. 2a again, the comb resource is divided into the two code division multiplexing (CDM) groups, and the resource of the first code division multiplexing (CDM) group is set in the second orthogonal frequency division multiplexing (OFDM) symbol, and the corresponding subcarriers are the first, third, fifth, seventh, ninth and eleventh subcarriers respectively. The resource of the second code division multiplexing (CDM) group is set in the second orthogonal frequency division multiplexing (OFDM) symbol, and the corresponding subcarriers are the second, fourth, sixth, eighth, tenth and twelfth subcarriers respectively. The sending end may select to send the demodulation reference signals (DMRSs) on the resource of the first code division multiplexing (CDM) group.

In one example, please refer to FIG. 2b again, the comb resource is divided into the two code division multiplexing (CDM) groups, and the resource of the first code division multiplexing (CDM) group is set in the second orthogonal frequency division multiplexing (OFDM) symbol and the third orthogonal frequency division multiplexing (OFDM) symbol, and the corresponding subcarriers are the first, third, fifth, seventh, ninth and eleventh subcarriers respectively. The resource of the second code division multiplexing (CDM) group is set in the second orthogonal frequency division multiplexing (OFDM) symbol and the third orthogonal frequency division multiplexing (OFDM) symbol, and the corresponding subcarriers are the second, fourth, sixth, eighth, tenth and twelfth subcarriers respectively. The sending end may select to send the demodulation reference signals (DMRSs) on the resource of the second code division multiplexing (CDM) group.

In one example, please refer to FIG. 3a again, the comb resource is divided into the three code division multiplexing (CDM) groups, and the resource of the first code division multiplexing (CDM) group is set in the second orthogonal frequency division multiplexing (OFDM) symbol, and the corresponding subcarriers are the first, second, seventh, and eighth subcarriers respectively. The resource of the second code division multiplexing (CDM) group is set in the third orthogonal frequency division multiplexing (OFDM) symbol, and the corresponding subcarriers are the third, fourth, ninth, and tenth subcarriers respectively. The resource of the third code division multiplexing (CDM) group is set in the second orthogonal frequency division multiplexing (OFDM) symbol, and the corresponding subcarriers are the fifth, sixth, eleventh and twelfth subcarriers respectively. The sending end may select to send the demodulation reference signals (DMRSs) on the resource of the third code division multiplexing (CDM) group.

In one example, a frequency domain resource distribution density of the comb resource may be determined according to requirements of a decoding success rate of data. Please refer to FIG. 2a and FIG. 3a again. The frequency domain resource distribution density of the comb resource in FIG. 2a is greater than that of the comb resource in FIG. 3a.

In one example, in response to determining that the decoding success rate of the data needs to be greater than a decoding threshold, the frequency domain resource distribution density of the comb resource is set to be smaller than a density threshold. In response to determining that the decoding success rate of the data needs to be smaller than the decoding threshold, the frequency domain resource distribution density of the comb resource is set to be greater than the density threshold.

In this way, the frequency domain resource distribution density may be adapted to the demanded decoding success rate. In one example, in a set wireless communication environment, the smaller the frequency domain resource distribution density is set, the more accurate the channel estimation, and the higher the decoding success rate.

In one example, in response to determining that the quantity of the equivalent pilot sequences demanded is greater than a quantity threshold, the frequency domain resource distribution density of the comb resource is set to be smaller than the density threshold; and in response to determining that the quantity of the equivalent pilot sequences demanded is smaller than the quantity threshold, the frequency domain resource distribution density of the comb resource is set to be greater than the density threshold. Here, the smaller the frequency domain resource distribution density is set, the larger the quantity of the equivalent pilot sequences obtained after the demodulation reference signals (DMRSs) transmitted on the different frequency bands of the comb resource are transformed to the time domain is. For example, in response to determining that the frequency domain resource distribution density is set to be ½, the quantity of the equivalent pilot sequences is 2; and in response to determining that the frequency domain resource distribution density is set to be ¼, the quantity of the equivalent pilot sequences is 4. Here, the greater the quantity of the equivalent pilot sequences is, the greater a value of the signal energy of the plurality of equivalent pilot sequences after superposition is, and the more accurate the channel estimation of the wireless transmission channel will be.

In one example, in response to determining that the quantity of available subcarriers is greater than a quantity threshold, the frequency domain resource distribution density of the comb resource is set to be greater than the density threshold. In response to determining that the quantity of the available subcarriers is smaller than the quantity threshold, the frequency domain resource distribution density of the comb resource is set to be smaller than the density threshold. In this way, the frequency domain resource distribution density of the comb resource may be adapted to the quantity of the available subcarriers, thus reducing a situation of affecting data transmission caused by the small quantity of the subcarriers used to transmit the data due to excessive setting of the frequency domain distribution density of the comb resource.

In one example, the receiving end may perform multiple channel estimations within the same time period, so that the receiving end may decode a data signal within the time period by synthesizing the results of the multiple channel estimations to improve the decoding success rate. Here, synthesizing of the results of the multiple channel estimations may be an average of the results of the multiple channel estimations. The average of the results of the multiple channel estimations may be an average of results of all the channel estimations or an average of the results of the part of channel estimations.

In the example of the disclosure, the demodulation reference signals (DMRSs) are sent on the comb resource. Since the demodulation reference signals (DMRSs) are sent on the comb resource, the demodulation reference signals (DMRSs) transmitted on the different frequency bands of the comb resource can obtain the plurality of equivalent pilot sequences after being transformed to the time domain.

In one example, the plurality of equivalent pilot sequences are obtained by transforming the received demodulation reference signals (DMRSs) to the time domain through inverse fast Fourier transform (IFFT).

In one example, a pilot sequence sent by the demodulation reference signals (DMRSs) is "0101", and the sending end sends the pilot sequence on the subcarrier contained in the comb resource after modulation. After receiving the demodulation reference signal (DMRS) on each subcarrier, the receiving end performs inverse fast Fourier transform (IFFT) on the received demodulation reference signals (DMRSs). Since there is subcarrier spacing between the subcarriers of the comb resource, the result of inverse fast Fourier transform (IFFT) will have the plurality of equivalent pilot sequences. For example, in response to determining that the frequency domain resource distribution density of the comb resource is ½, the two equivalent pilot sequences will appear, and the pilot sequence is "0101 0101", that is, the pilot sequence "0101" appears twice repeatedly.

In one example, superposing of the signal energy of the plurality of equivalent pilot sequences may be superposing of signal energy a of the pilot sequence "0101" occurring for the first time and signal energy b of the pilot sequence "0101" occurring for the second time to obtain the superposed signal energy X=a+b. Here, the signal energy may refer to receiving power.

In one example, channel estimation may be to perform correlation operation on the signal energy of the received pilot sequence and the signal energy of the sent pilot sequence. In one example, the correlation operation of the signal energy of the pilot sequence may be to divide the signal energy of the received pilot sequence by the signal energy of the sent pilot sequence. For example, the signal energy of the received pilot sequence is A, and the signal energy of the sent pilot sequence is B, then the channel estimation value H=A/B, here A is smaller than B.

In the example of the disclosure, the demodulation reference signals (DMRSs) are sent on the comb resource. Since the demodulation reference signals (DMRSs) are sent on the comb resource, the demodulation reference signals (DMRSs) transmitted on the different frequency bands of the comb resource can obtain the plurality of equivalent pilot sequences after being transformed to the time domain. The technical solution of the present example superposes the signal energy of the plurality of equivalent pilot sequences and then performs channel estimation of the wireless transmission channel. On the one hand, the solution provided by the example of the disclosure reduces a phenomenon of a large error caused by too low signal energy compared with channel estimation of obtaining merely signal energy of a single pilot sequence. On the other hand, the solution provided by the example of the disclosure can obtain large signal energy of the pilot sequence for channel estimation in a case that the signal energy of the single pilot sequence is small due to low sending power at the sending end and/or large path loss, so as to make a channel estimation result more accurate and improve a success rate of data demodulation.

Figure 5:
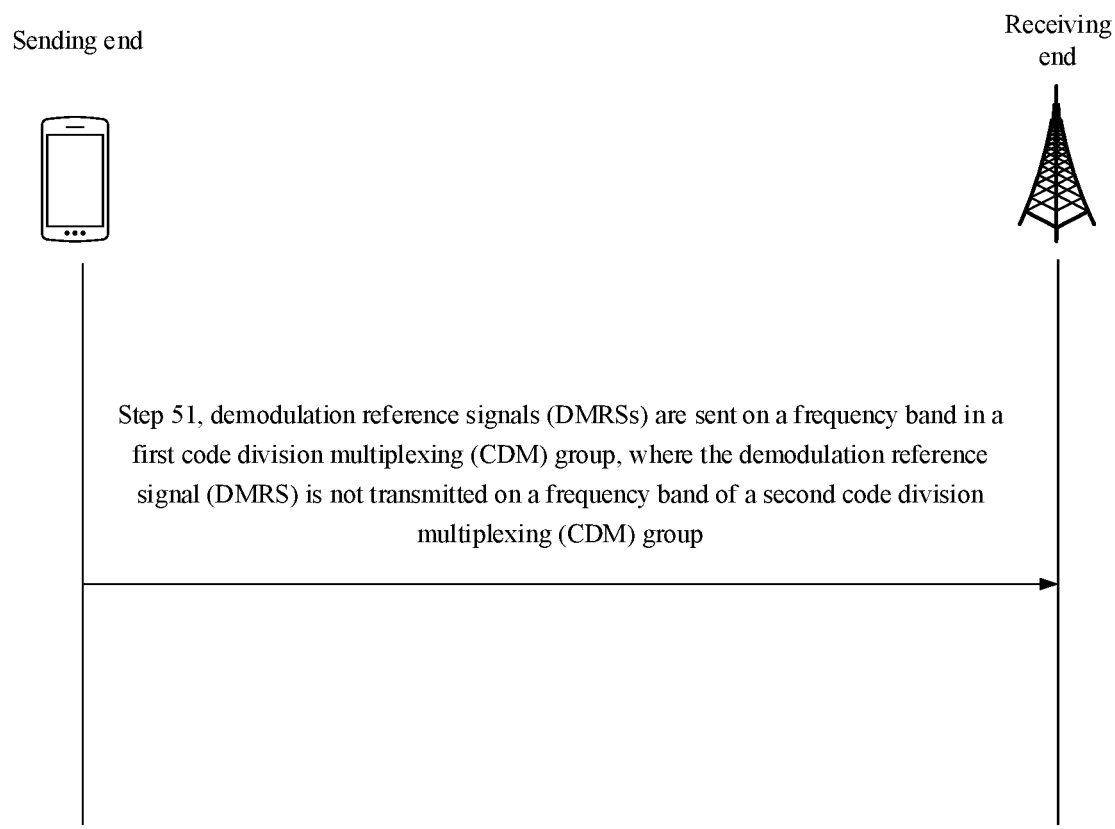
FIG. 5 is a flow diagram of a channel estimation method shown according to an example.

As shown in FIG. 5, the present example provides a channel estimation method. A comb resource corresponds to a first code division multiplexing (CDM) group and at least one second code division multiplexing (CDM) group, and the first code division multiplexing (CDM) group and the second code division multiplexing (CDM) group contain different frequency bands.

In step 41, sending demodulation reference signals (DMRSs) on the comb resource includes: step 51, where the demodulation reference signals (DMRSs) are sent on the frequency band in the first code division multiplexing (CDM) group, where the demodulation reference signal (DMRS) is not transmitted on the frequency band of the second code division multiplexing (CDM) group.

In one example, among the plurality of code division multiplexing (CDM) groups, a code division multiplexing (CDM) group to which a resource of sending the demodulation reference signals (DMRSs) belongs is a first code division multiplexing (CDM) group. Among the plurality of code division multiplexing (CDM) groups, other code division multiplexing (CDM) groups other than the second code division multiplexing (CDM) group are second code division multiplexing (CDM) groups. Here, there may be the plurality of second code division multiplexing (CDM) groups.

In one example, the first code division multiplexing (CDM) group and the second code division multiplexing (CDM) group are contained in the at least one frequency band distributed within the same or plurality of orthogonal frequency division multiplexing (OFDM) symbols; different frequency bands have the same subcarrier spacing; and each frequency band may contain one resource element (RE) or the plurality of adjacent resource elements (REs).

In one example, the first code division multiplexing (CDM) group and the second code division multiplexing (CDM) group are contained in the at least one frequency band distributed within the same orthogonal frequency division multiplexing (OFDM) symbols. Please refer to FIG. 2a again. The comb resource is divided into the two code division multiplexing (CDM) groups, namely the first code division multiplexing (CDM) group and the second code division multiplexing (CDM) group respectively. A resource of the first code division multiplexing (CDM) group is set in a second orthogonal frequency division multiplexing (OFDM) symbol, and the corresponding subcarriers are the first, third, fifth, seventh, ninth and eleventh subcarriers respectively. A resource of the second code division multiplexing (CDM) group is set in the second orthogonal frequency division multiplexing (OFDM) symbol, and the corresponding subcarriers are the second, fourth, sixth, eighth, tenth and twelfth subcarriers respectively.

In one example, the frequency band in the code division multiplexing (CDM) group may be set according to a signal reception quality when the demodulation reference signal (DMRS) is sent on the frequency band. For example, the receiving end demands that the signal reception quality of the demodulation reference signals (DMRSs) sent on the frequency band of the first code division multiplexing (CDM) group is higher than that of the demodulation reference signals (DMRSs) sent on the frequency band contained in the second code division multiplexing (CDM) group. Then the frequency band in the first code division multiplexing (CDM) group is set as a first frequency band, and the frequency band in the second code division multiplexing (CDM) group is set as a second frequency band, where the signal reception quality of the demodulation reference signal (DMRSs) sent by the first frequency band in a wireless communication environment is greater than that of the demodulation reference signals (DMRSs) sent by the second frequency band in the wireless communication environment.

In one example, neither the demodulation reference signal (DMRS) nor user face data and/or control face data are transmitted on the frequency band of the second code division multiplexing (CDM) group. Thus, since there is no data transmission on some subcarriers in the frequency domain, when the demodulation reference signals (DMRSs) received by the receiving end is transformed to the time domain, the pilot sequence will repeat, that is, the plurality of equivalent pilot sequences will appear. In this way, the receiving end may perform channel estimation by utilizing the plurality of equivalent pilot sequences.

In one example, the comb resource contained in the first code division multiplexing (CDM) group is determined according to the frequency domain resource distribution density of the comb resource. For example, there are totally twelve consecutive subcarriers. In response to determining that the frequency domain resource distribution density is ½, the first code division multiplexing (CDM) group may include the first, third, fifth, seventh, ninth and eleventh sub carriers.

In one example, the frequency domain resource distribution density of the comb resource is determined according to the number of times of superposing needed by the pilot sequences. In one example, the number of times of superposing is greater than a number-of-times threshold, and the frequency domain resource distribution density is set to be smaller than a density threshold. Here, the frequency domain resource distribution density may be flexibly adjusted according to the number of times of superposing, so that the obtained channel estimation result better meets channel estimation demands under different channel estimation environments. Here, the larger the number of times of superposing is, the greater the pilot signal energy will be, and the more accurate the channel estimation result will be.

Figure 8A:
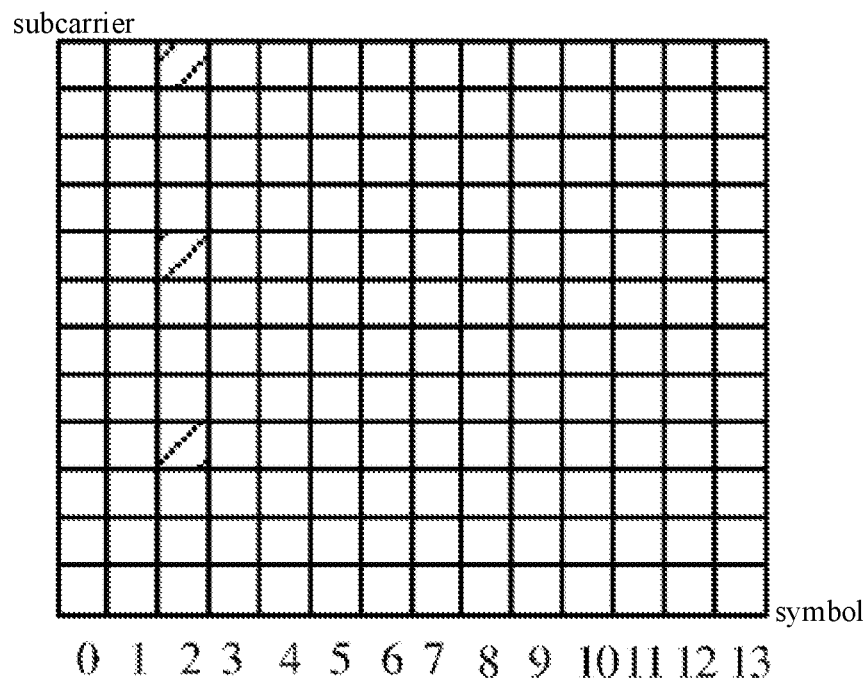
FIG. 8a is a schematic diagram of a time-frequency domain resource shown according to an example.
Figure 8B:
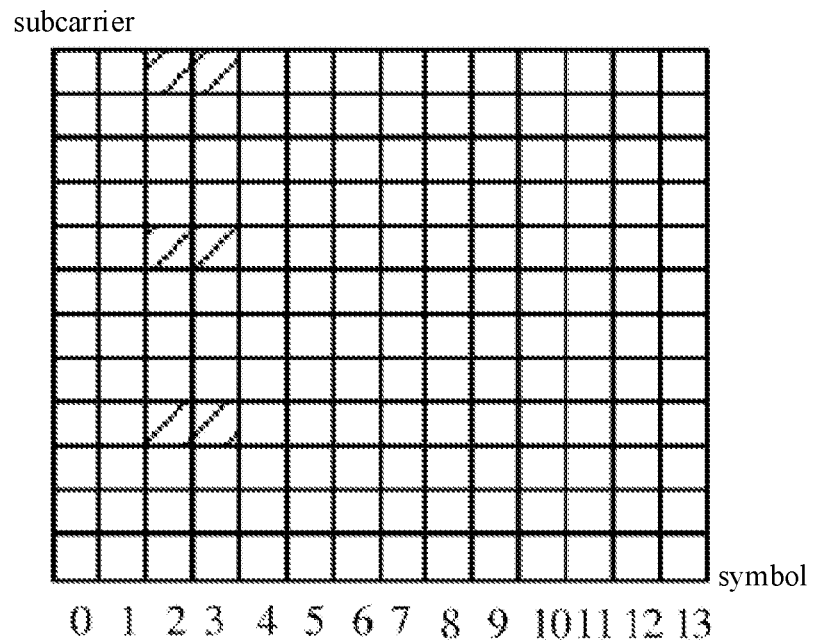
FIG. 8b is a schematic diagram of a time-frequency domain resource shown according to an example.

In one example, please refer to FIG. 8a and FIG. 8b. The frequency domain resource distribution density of the comb resource is ¼, the number of repeat times of the pilot sequences is 4, and thus superposing may be performed for 4 times. Here, the comb resource shown in FIG. 8a is used to send a single-symbol demodulation reference signal (DMRS). The comb resource shown in FIG. 8b is used to send a double-symbol demodulation reference signal (DMRS).

Figure 9A:
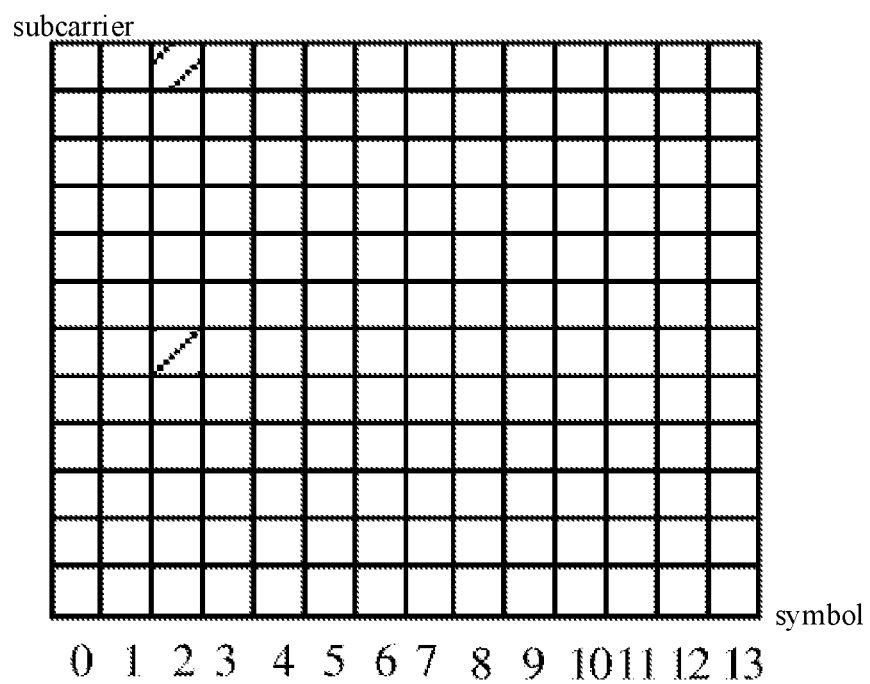
FIG. 9a is a schematic diagram of a time-frequency domain resource shown according to an example.
Figure 9B:
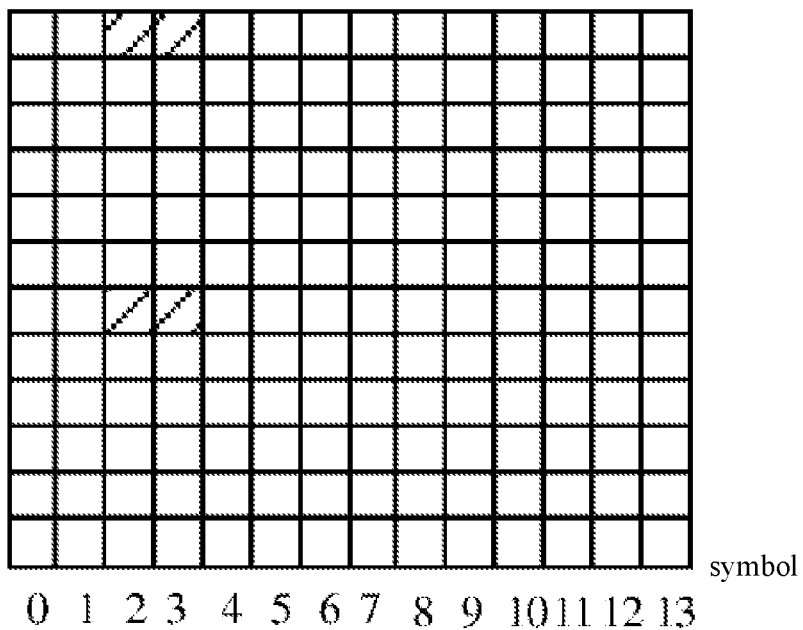
FIG. 9b is a schematic diagram of a time-frequency domain resource shown according to an example.

In one example, please refer to FIG. 9a and FIG. 9b. The frequency domain resource distribution density of the comb resource is ⅙, and the number of repeat times of the pilot sequences is 6. Here, the comb resource shown in FIG. 9a is used to send the single-symbol demodulation reference signal (DMRS). The comb resource shown in FIG. 9b is used to send the double-symbol demodulation reference signal (DMRS).

Figure 10A:
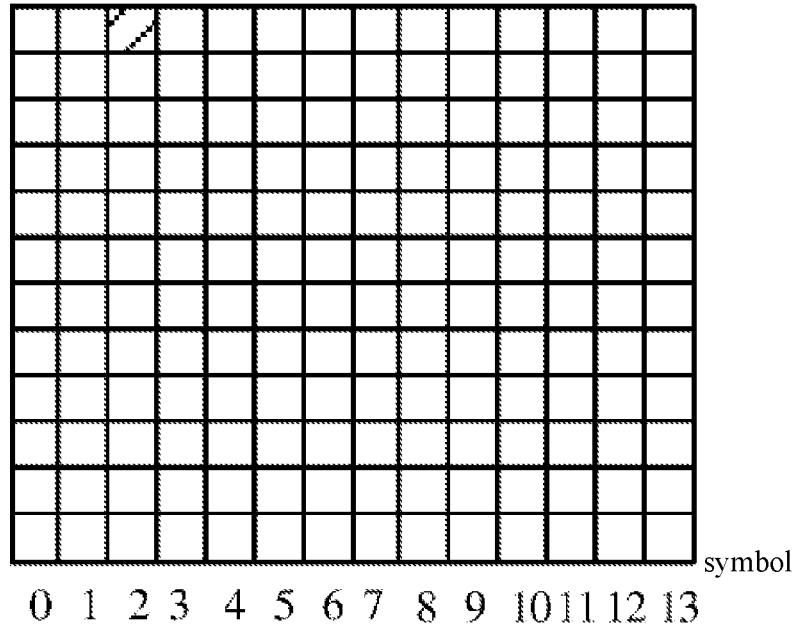
FIG. 10a is a schematic diagram of a time-frequency domain resource shown according to an example.
Figure 10B:
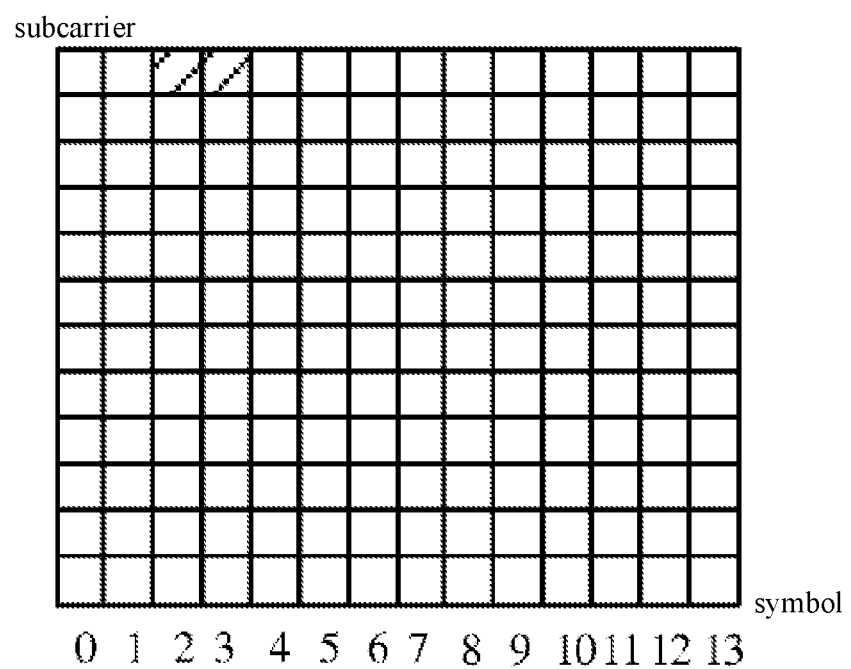
FIG. 10b is a schematic diagram of a time-frequency domain resource shown according to an example.

In one example, please refer to FIG. 10a and FIG. 10b. The frequency domain resource distribution density of the comb resource is 1/12, the number of repeat times of the pilot sequences is 12, and thus superposing may be performed for 12 times. Here, the comb resource shown in FIG. 10a is used to send the single-symbol demodulation reference signal (DMRS). The comb resource shown in FIG. 10b is used to send the double-symbol demodulation reference signal (DMRS).

In one example, after the first code division multiplexing (CDM) group is determined, the remaining comb resources belong to the second code division multiplexing (CDM) groups. Here, there may be the plurality of second code division multiplexing (CDM) groups.

Figure 6:
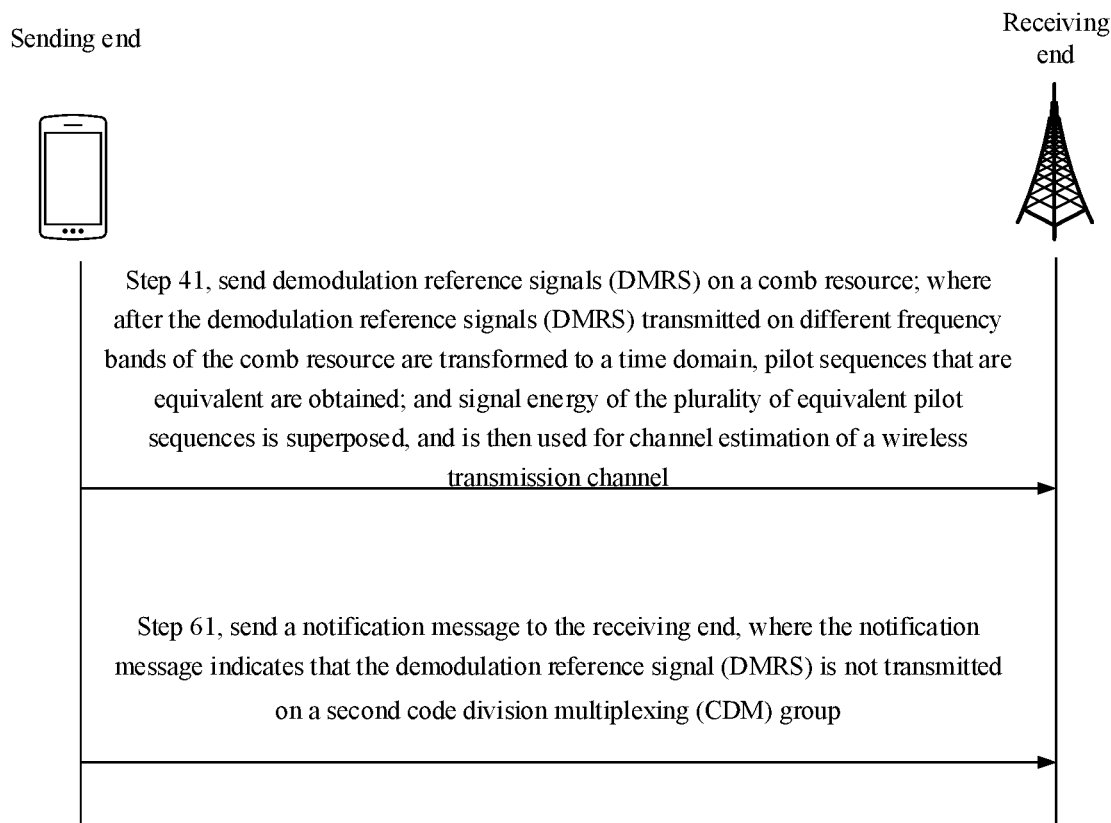
FIG. 6 is a flow diagram of a channel estimation method shown according to an example.

As shown in FIG. 6, the present example provides a channel estimation method, including previously recited step 41 and further including step 61.

In step 61, a notification message is sent to a receiving end, where the notification message indicates that a demodulation reference signal (DMRS) is not transmitted on a second code division multiplexing (CDM) group.

In one example, the notification message may be sent to the receiving end in response to establishment of a radio resource control (RRC) connection between the receiving end and a sending end. In this way, when receiving the demodulation reference signal (DMRS), the receiving end may demodulate a received signal based on the notification message.

In one example, after a first code division multiplexing (CDM) group is determined, the remaining comb resources belong to a second code division multiplexing (CDM) groups. After determining the second code division multiplexing (CDM) group, the sending end sends the notification message to the receiving end. In this way, when receiving the signal, the receiving end may determine, based on the notification message, that the demodulation reference signal (DMRS) is sent on a comb resource contained in the first code division multiplexing (CDM) group, and can demodulate a received signal based on the notification message.

Figure 7:
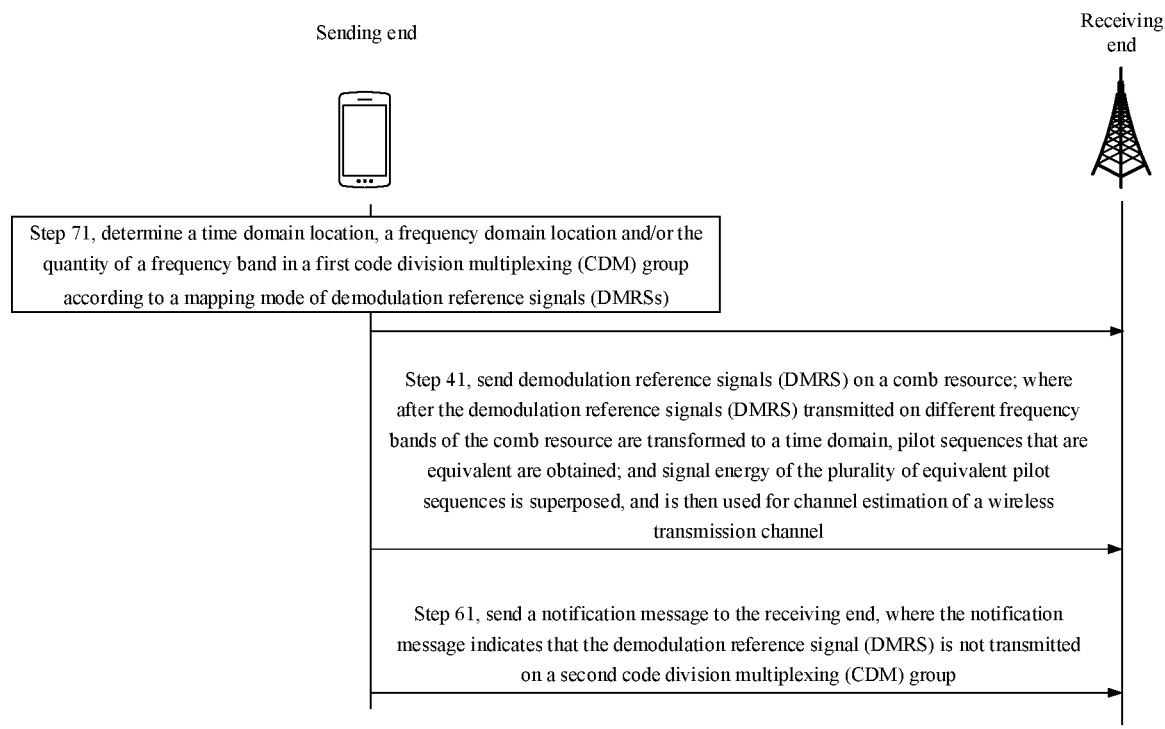
FIG. 7 is a flow diagram of a channel estimation method shown according to an example.

As shown in FIG. 7, the present example provides a channel estimation method, further including step 71 prior to steps 41 and 61.

In step 71, a time domain location, a frequency domain location and/or the quantity of a frequency band in a first code division multiplexing (CDM) group are/is determined according to a mapping mode of demodulation reference signals (DMRSs).

Which means that at least of one the following, according to a mapping mode of the DMRS, are/is determined: a time domain location of the frequency band in the first CDM group; a frequency domain location of the frequency band in the first CDM group; and, the quantity of the frequency band in the first CDM group.

In one example, the time domain location, the frequency domain location and/or the quantity of the frequency band may be a time domain location, a frequency domain location and/or the quantity of a resource element (RE).

In one example, different mapping modes map the demodulation reference signals (DMRSs) to the different time domain locations and frequency domain locations for transmission.

In one example, the mapping mode of the demodulation reference signals (DMRSs) may directly indicate a time domain location, a frequency domain location and/or the quantity of a frequency band in the first code division multiplexing (CDM) group. For example, the mapping mode of the demodulation reference signals (DMRSs) may directly indicate that in the first code division multiplexing (CDM) group, the time domain location is a location of a second symbol, the frequency domain location is locations of first, third, fifth, seventh, ninth, and eleventh subcarriers, and the quantity is six.

In one example, the mapping mode of the demodulation reference signals (DMRSs) may directly indicate a frequency domain resource distribution density of the comb resource in the first code division multiplexing (CDM) group. A receiving end may determine the time domain location, the frequency domain location and/or the quantity of the frequency band in the first code division multiplexing (CDM) group according to the frequency domain resource distribution density.

In one example, the time domain location, the frequency domain location and/or the quantity of the frequency band in the first code division multiplexing (CDM) group have a one-to-one corresponding mapping relationship with the frequency domain resource distribution density. For example, in response to determining that the frequency domain resource distribution density is a first frequency domain resource distribution density, the time domain location of the frequency band in the first code division multiplexing (CDM) group is a first time domain location, the frequency domain location is a first frequency domain location, and the quantity is N. Here, N is a positive integer.

In one example, the mapping mode at least indicates the frequency domain resource distribution density of the comb resource; and the different mapping modes correspond to the different frequency domain resource distribution densities.

In one example, please refer to FIG. 8a and FIG. 8b, which show a first mapping mode, and the frequency domain resource distribution density of the comb resource indicated by the first mapping mode is ¼. Here, the first mapping mode shown in FIG. 8a is used to send a single-symbol demodulation reference signal (DMRS). The first mapping mode shown in FIG. 8b is used to send a double-symbol demodulation reference signal (DMRS).

In one example, please refer to FIG. 9a and FIG. 9b, which show a second mapping mode, and the frequency domain resource distribution density of the comb resource indicated by the second mapping mode is ⅙. Here, the second mapping mode shown in FIG. 9a is used to send the single-symbol demodulation reference signal (DMRS). The second mapping mode shown in FIG. 9b is used to send the double-symbol demodulation reference signal (DMRS).

In one example, please refer to FIG. 10a and FIG. 10b, which show a third mapping mode, and the frequency domain resource distribution density of the comb resource indicated by the third mapping mode is 1/12. Here, the third mapping mode shown in FIG. 10a is used to send the single-symbol demodulation reference signal (DMRS). The third mapping mode shown in FIG. 10b is used to send the double-symbol demodulation reference signal (DMRS).

In one example, the frequency domain resource distribution density of the comb resource is determined according to the number of times of superposing needed by the pilot sequences. In one example, the number of times of superposing is greater than a number-of-times threshold, and the frequency domain resource distribution density is set to be smaller than a density threshold. Here, the larger the number of times of superposing is, the greater the pilot signal energy will be, and the more accurate the channel estimation result will be.

In one example, the number of times of superposing is negatively correlated with the frequency domain resource distribution density. For example, in response to determining that the number of times of superposing is N, the frequency domain resource distribution density is 1/N.

Figure 11:
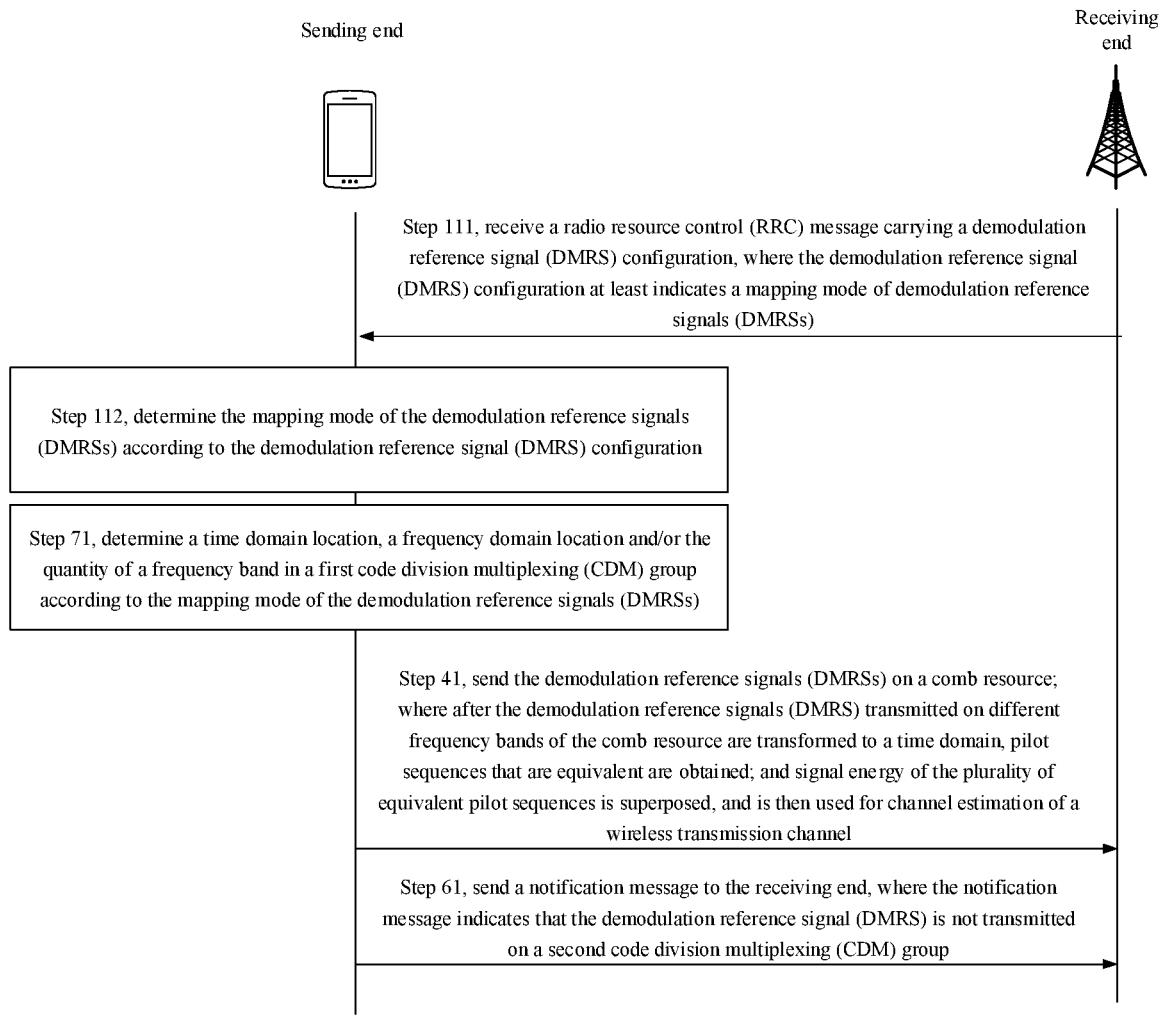
FIG. 11 is a flow diagram of a channel estimation method shown according to an example.

As shown in FIG. 11, the present example provides a channel estimation method, further including steps 111 and 112 prior to steps 71, 41, and 61.

In step 111, a radio resource control (RRC) message carrying a demodulation reference signal (DMRS) configuration is received, where the demodulation reference signal (DMRS) configuration at least indicates a mapping mode of the demodulation reference signals (DMRSs).

In step 112, the mapping mode of the demodulation reference signals (DMRSs) is determined according to a demodulation reference signal (DMRS) configuration.

In one example, the carried demodulation reference signal (DMRS) configuration is sent by utilizing a radio resource control (RRC) message so as to improve the compatibility of the radio resource control (RRC) message.

In one example, the radio resource control (RRC) message carrying the demodulation reference signal (DMRS) configuration may be received when a sending end and a receiving end establish a radio resource control (RRC) connection.

In order to facilitate understanding of any example of the disclosure, the technical solution of the disclosure is further illustrated through one example.

Figure 12:
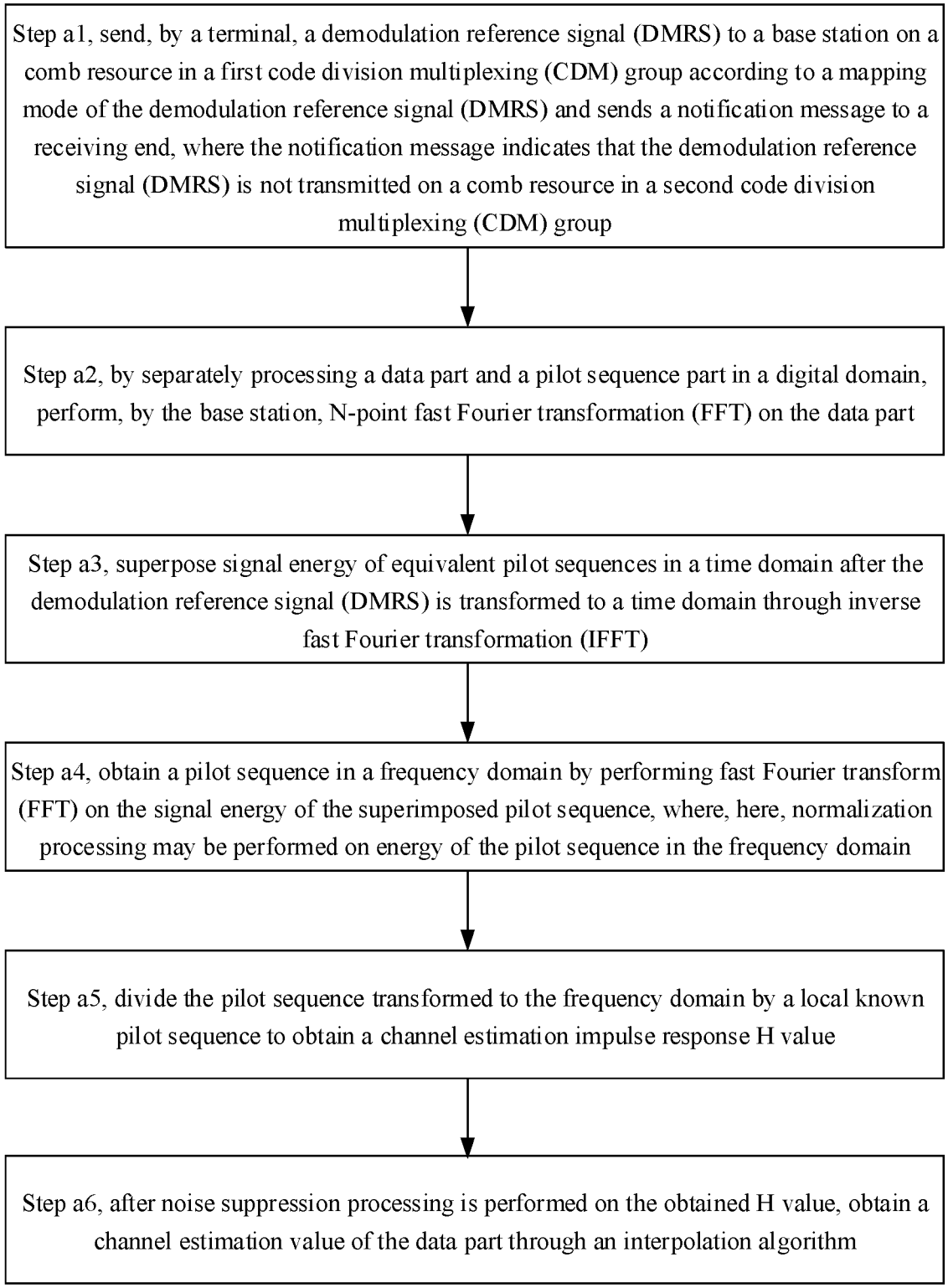
FIG. 12 is a flow diagram of a channel estimation method shown according to an example.

A channel estimation system includes a terminal and a base station. As shown in FIG. 12, the present example provides a channel estimation method, including steps a1, a2, a3, a4, a5, and a6.

In step a1, a terminal sends a demodulation reference signal (DMRS) to a base station on a comb resource in a first code division multiplexing (CDM) group according to a mapping mode of the demodulation reference signal (DMRS); and sends a notification message to a receiving end, where the notification message indicates that the demodulation reference signal (DMRS) is not transmitted on a comb resource in a second code division multiplexing (CDM) group.

Step a2, by separately processing a data part and a pilot sequence part in a digital domain, the base station performs N-point fast Fourier transformation (FFT) on the data part.

Step a3, signal energy of equivalent pilot sequences in a time domain is superposed after the demodulation reference signal (DMRS) is transformed to a time domain through inverse fast Fourier transformation (IFFT).

Step a4, a pilot sequence in a frequency domain is obtained by performing fast Fourier transform (FFT) on the superposed signal energy of the pilot sequence. Here, normalization processing may be performed on energy of the pilot sequence in the frequency domain.

Step a5, the pilot sequence transformed to the frequency domain is divided by a local known pilot sequence to obtain a channel estimation impulse response H value.

Step a6, after noise suppression processing is performed on the obtained H value, a channel estimation value of the data part is obtained through an interpolation algorithm.

Figure 13:
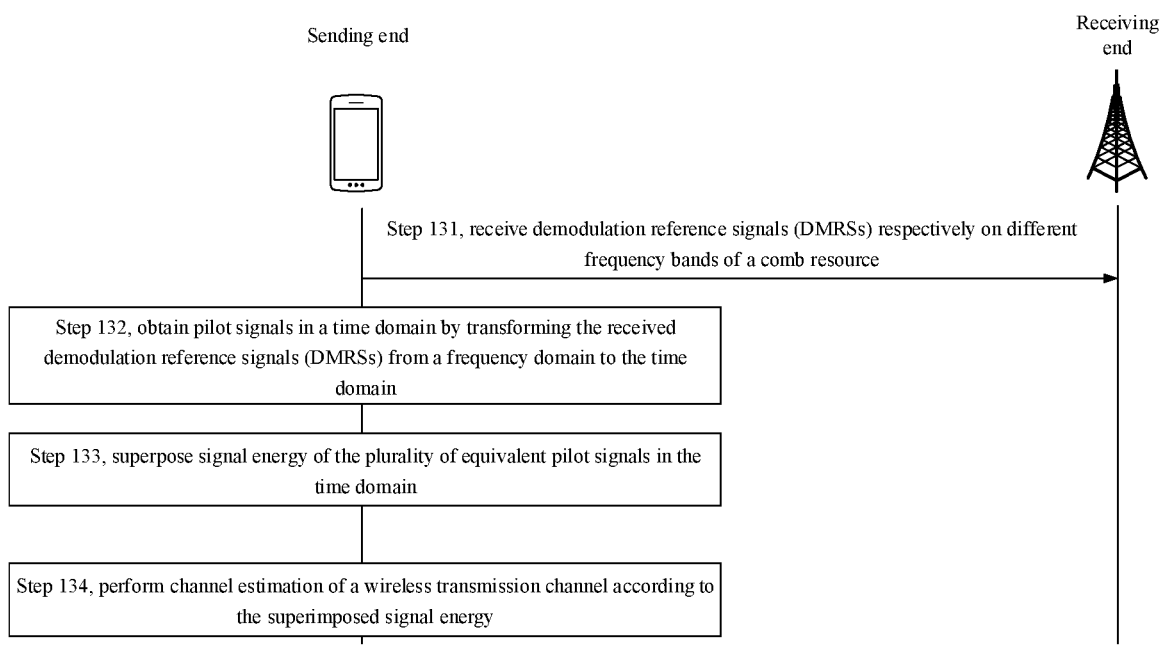
FIG. 13 is a flow diagram of a channel estimation method shown according to an example.

As shown in FIG. 13, the present example provides a channel estimation method, applied by a receiving end, and including steps 131-134.

In step 131, demodulation reference signals (DMRSs) are received respectively on different frequency bands of a comb resource.

Then in step 132, pilot signals in a time domain are obtained by transforming the received demodulation reference signals (DMRSs) from a frequency domain to the time domain.

Next in step 133, signal energy of the plurality of equivalent pilot signals in the time domain is superposed.

Finally, in step 134, channel estimation of a wireless transmission channel is performed according to the superposed signal energy.

In one example, a sending end may be a terminal, and the receiving end receiving the demodulation reference signals (DMRSs) may be a base station. In another example, the sending end may be the base station, and the receiving end receiving the demodulation reference signals (DMRSs) may be the terminal.

The terminal may be, but is not limited to, a mobile phone, a wearable device, a vehicle-mounted terminal, a road side unit (RSU), a smart home terminal, an industrial sensing device and/or a medical device, and the like.

The base station is an interface device for the terminal to access a network. The base station may be various types of base stations, such as a base station of the 3th generation mobile communication (3G) network, a base station of the 4th generation mobile communication (4G) network, a base station of the 5th generation mobile communication (5G) network or other evolved base stations.

Here, channel estimation of the wireless transmission channel may be channel estimation of various channels such as a physical uplink control channel (PUCCH), a physical uplink shared channel (PUSCH), a physical downlink control channel (PDCCH), and a physical downlink shared channel (PDSCH).

In one example, when the sending end sends uplink data to the receiving end, the sending end needs to send the pilot sequence, so that the receiving end performs channel estimation of the wireless transmission channel according to the received pilot sequence to obtain a channel estimation result, and utilizes the channel estimation result to complete decoding of the received uplink data. Here, the pilot sequence may be sent through the demodulation reference signals (DMRSs).

In one example, the comb resource may contain at least one frequency band distributed within the same or plurality of orthogonal frequency division multiplexing (OFDM) symbols; different frequency bands have the same subcarrier spacing; and each frequency band may contain one resource element (RE) or the plurality of adjacent resource elements (REs).

In one example, the comb resource is at least one frequency band distributed within one orthogonal frequency division multiplexing (OFDM) symbol. Please refer to FIG. 2a again. Each row in FIG. 2a represents one subcarrier, and each column represents one orthogonal frequency division multiplexing (OFDM) symbol. The comb resource is set in the second orthogonal frequency division multiplexing (OFDM) symbol, and the corresponding subcarriers are the first, third, fifth, seventh, ninth and eleventh subcarriers respectively. In one example, the demodulation reference signals (DMRSs) may be sent on the second orthogonal frequency division multiplexing (OFDM) symbol and on the first, third, fifth, seventh, ninth and eleventh subcarriers. That is, each frequency band corresponds to one resource element (RE), and the comb resource occupies a total of six resource elements (REs).

In one example, the comb resource is at least one frequency band distributed within the plurality of orthogonal frequency division multiplexing (OFDM) symbols. Here, the plurality of orthogonal frequency division multiplexing (OFDM) symbols may be orthogonal frequency division multiplexing (OFDM) symbols adjacent in the time domain. Please refer to FIG. 2b again, the comb resource is set in the second orthogonal frequency division multiplexing (OFDM) symbol and the third orthogonal frequency division multiplexing (OFDM) symbol, and the corresponding subcarriers are the first, third, fifth, seventh, ninth and eleventh subcarriers respectively. That is, each frequency band corresponds to the two resource elements (REs), and the comb resource occupies a total of twelve resource elements (REs).

In one example, the comb resource may be divided into a plurality of code division multiplexing (CDM) groups. The demodulation reference signals (DMRSs) may be sent on resources contained in one code division multiplexing (CDM) group. Here, among the plurality of code division multiplexing (CDM) groups, a code division multiplexing (CDM) group to which the resource of sending the demodulation reference signals (DMRSs) belongs is a first code division multiplexing (CDM) group. Among the plurality of code division multiplexing (CDM) groups, other code division multiplexing (CDM) groups other than the second code division multiplexing (CDM) group are second code division multiplexing (CDM) groups. Here, there may be the plurality of second code division multiplexing (CDM) groups.

In one example, the sending end may select to send the demodulation reference signals (DMRSs) on the resource of any code division multiplexing (CDM) group.

In one example, please refer to FIG. 2a again, the comb resource is divided into the two code division multiplexing (CDM) groups, and the resource of the first code division multiplexing (CDM) group is set in the second orthogonal frequency division multiplexing (OFDM) symbol, and the corresponding subcarriers are the first, third, fifth, seventh, ninth and eleventh subcarriers respectively. The resource of the second code division multiplexing (CDM) group is set in the second orthogonal frequency division multiplexing (OFDM) symbol, and the corresponding subcarriers are the second, fourth, sixth, eighth, tenth and twelfth subcarriers respectively. The sending end may select to send the demodulation reference signals (DMRSs) on the resource of the first code division multiplexing (CDM) group.

In one example, please refer to FIG. 2b again, the comb resource is divided into the two code division multiplexing (CDM) groups, and the resource of the first code division multiplexing (CDM) group is set in the second orthogonal frequency division multiplexing (OFDM) symbol and the third orthogonal frequency division multiplexing (OFDM) symbol, and the corresponding subcarriers are the first, third, fifth, seventh, ninth and eleventh subcarriers respectively. The resource of the second code division multiplexing (CDM) group is set in the second orthogonal frequency division multiplexing (OFDM) symbol and the third orthogonal frequency division multiplexing (OFDM) symbol, and the corresponding subcarriers are the second, fourth, sixth, eighth, tenth and twelfth subcarriers respectively. The sending end may select to send the demodulation reference signals (DMRSs) on the resource of the second code division multiplexing (CDM) group.

In one example, please refer to FIG. 3a again, the comb resource is divided into the three code division multiplexing (CDM) groups, and the resource of the first code division multiplexing (CDM) group is set in the second orthogonal frequency division multiplexing (OFDM) symbol, and the corresponding subcarriers are the first, second, seventh, and eighth subcarriers respectively. The resource of the second code division multiplexing (CDM) group is set in the third orthogonal frequency division multiplexing (OFDM) symbol, and the corresponding subcarriers are the third, fourth, ninth, and tenth subcarriers respectively. The resource of the third code division multiplexing (CDM) group is set in the second orthogonal frequency division multiplexing (OFDM) symbol, and the corresponding subcarriers are the fifth, sixth, eleventh and twelfth subcarriers respectively. The sending end may select to send the demodulation reference signals (DMRSs) on the resource of the third code division multiplexing (CDM) group.

In one example, a frequency domain resource distribution density of the comb resource may be determined according to requirements of a decoding success rate of data. Please refer to FIG. 2a and FIG. 3a again. The frequency domain resource distribution density of the comb resource in FIG. 2a is greater than that of the comb resource in FIG. 3a. In one example, in response to determining that the decoding success rate of the data needs to be greater than a decoding threshold, the frequency domain resource distribution density of the comb resource is set to be smaller than a density threshold. In response to determining that the decoding success rate of the data needs to be smaller than the decoding threshold, the frequency domain resource distribution density of the comb resource is set to be greater than the density threshold.

In this way, the frequency domain resource distribution density may be adapted to the demanded decoding success rate. In one example, in a set wireless communication environment, the smaller the frequency domain resource distribution density is set, the more accurate the channel estimation is, and the higher the decoding success rate is.

In one example, in response to determining that the quantity of the equivalent pilot sequences demanded is greater than a quantity threshold, the frequency domain resource distribution density of the comb resource is set to be smaller than the density threshold; and in response to determining that the quantity of the equivalent pilot sequences demanded is smaller than the quantity threshold, the frequency domain resource distribution density of the comb resource is set to be greater than the density threshold. Here, the smaller the frequency domain resource distribution density is set, the larger the quantity of the equivalent pilot sequences obtained after the demodulation reference signals (DMRSs) transmitted on the different frequency bands of the comb resource are transformed to the time domain is. For example, in response to determining that the frequency domain resource distribution density is set to be ½, the quantity of the equivalent pilot sequences is 2; and in response to determining that the frequency domain resource distribution density is set to be ¼, the quantity of the equivalent pilot sequences is 4. Here, the greater the quantity of the equivalent pilot sequences is, the greater a value of the signal energy of the plurality of equivalent pilot sequences after superposition is, and the more accurate the channel estimation of the wireless transmission channel will be.

In one example, in response to determining that the quantity of available subcarriers is greater than a quantity threshold, the frequency domain resource distribution density of the comb resource is set to be greater than the density threshold. In response to determining that the quantity of the available subcarriers is smaller than the quantity threshold, the frequency domain resource distribution density of the comb resource is set to be smaller than the density threshold. In this way, the frequency domain resource distribution density of the comb resource may be adapted to the quantity of the available subcarriers, thus reducing a situation of affecting data transmission caused by the small quantity of the subcarriers used to transmit the data due to excessive setting of the frequency domain distribution density of the comb resource.

In one example, the receiving end may perform multiple channel estimations within the same time period, so that the receiving end may decode a data signal within the time period by synthesizing the results of the multiple channel estimations to improve the decoding success rate. Here, synthesizing of the results of the multiple channel estimations may be an average of the results of the multiple channel estimations. The average of the results of the multiple channel estimations may be an average of results of all the channel estimations or an average of the results of the part of channel estimations.

In one example, the plurality of equivalent pilot sequences are obtained by transforming the received demodulation reference signals (DMRSs) to the time domain through inverse fast Fourier transform (IFFT).

In one example, a pilot sequence sent by the demodulation reference signals (DMRSs) is "0101", and the sending end sends the pilot sequence on the subcarrier contained in the comb resource after modulation. After receiving the demodulation reference signal (DMRS) on each subcarrier, the receiving end performs inverse fast Fourier transform (IFFT) on the received demodulation reference signals (DMRSs). Since there is subcarrier spacing between the subcarriers of the comb resource, the result of inverse fast Fourier transform (IFFT) will have the plurality of equivalent pilot sequences. For example, in response to determining that the frequency domain resource distribution density of the comb resource is ½, the two equivalent pilot sequences will appear, and the pilot sequence is "0101 0101", that is, the pilot sequence "0101" appears twice repeatedly.

In one example, superposing of the signal energy of the plurality of equivalent pilot sequences may be superposing of signal energy a of the pilot sequence "0101" occurring for the first time and signal energy b of the pilot sequence "0101" occurring for the second time to obtain the superposed signal energy X=a+b. Here, the signal energy may refer to receiving power.

In one example, channel estimation may be to perform correlation operation on the signal energy of the received pilot sequence and the signal energy of the sent pilot sequence. In one example, the correlation operation of the signal energy of the pilot sequence may be to divide the signal energy of the received pilot sequence by the signal energy of the sent pilot sequence. For example, the signal energy of the received pilot sequence is A, and the signal energy of the sent pilot sequence is B, then the channel estimation value H=A/B, here A is smaller than B.

In the example of the disclosure, channel estimation of the wireless transmission channel is performed after the signal energy of the plurality of equivalent pilot sequences is superposed. On the one hand, the solution provided by the example of the disclosure reduces a phenomenon of a large error caused by too low signal energy compared with channel estimation of obtaining merely signal energy of a single pilot sequence. On the other hand, the solution provided by the example of the disclosure can obtain large signal energy of the pilot sequence for channel estimation in a case that the signal energy of the single pilot sequence is small due to low sending power at the sending end and/or large path loss, so as to make a channel estimation result more accurate and improve a success rate of data demodulation.

Figure 14:
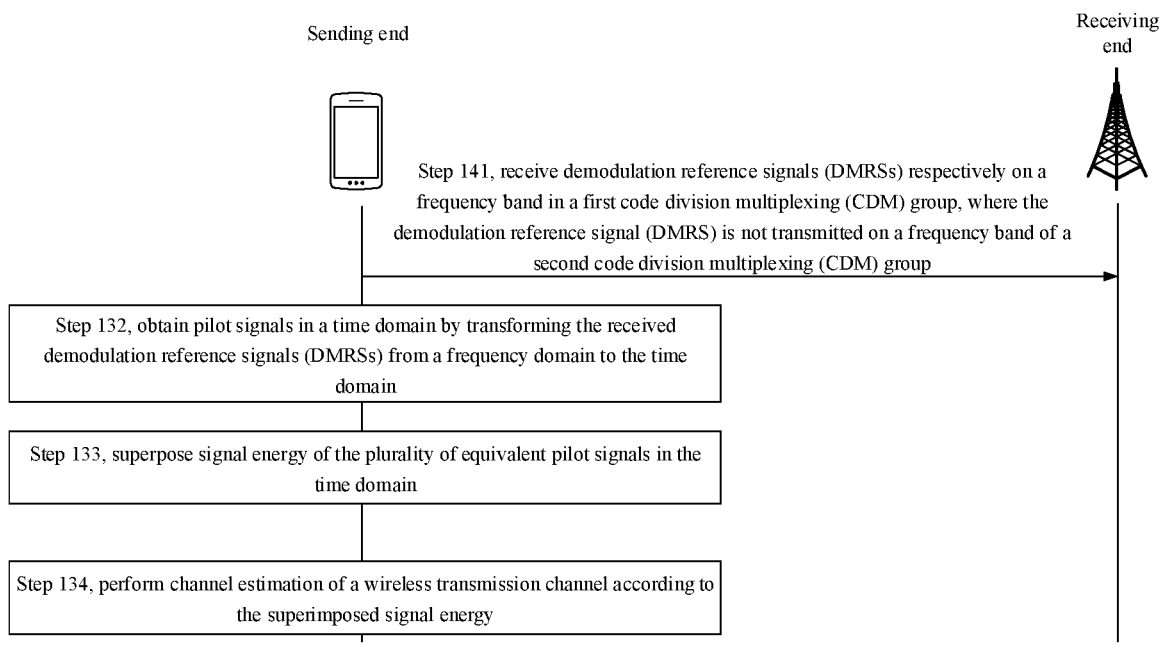
FIG. 14 is a flow diagram of a channel estimation method shown according to an example.

As shown in FIG. 14, the present example provides a channel estimation method. A comb resource corresponds to a first code division multiplexing (CDM) group and a second code division multiplexing (CDM) group, and the first code division multiplexing (CDM) group and the second code division multiplexing (CDM) group contain different frequency bands.

In step 131, receiving demodulation reference signals (DMRSs) respectively on the different frequency bands of the comb resource includes: step 141, the demodulation reference signals (DMRSs) are received respectively on the frequency band in the first code division multiplexing (CDM) group, where the demodulation reference signal (DMRS) is not transmitted on the frequency band of the second code division multiplexing (CDM) group.

In one example, among the plurality of code division multiplexing (CDM) groups, a code division multiplexing (CDM) group to which a resource of sending the demodulation reference signals (DMRSs) belongs is a first code division multiplexing (CDM) group. Among the plurality of code division multiplexing (CDM) groups, other code division multiplexing (CDM) groups other than the second code division multiplexing (CDM) group are second code division multiplexing (CDM) groups. Here, there may be the plurality of second code division multiplexing (CDM) groups.

In one example, the first code division multiplexing (CDM) group and the second code division multiplexing (CDM) group are contained in the at least one frequency band distributed within the same or plurality of orthogonal frequency division multiplexing (OFDM) symbols; different frequency bands have the same subcarrier spacing; and each frequency band may contain one resource element (RE) or the plurality of adjacent resource elements (REs).

In one example, the first code division multiplexing (CDM) group and the second code division multiplexing (CDM) group are contained in the at least one frequency band distributed within the same orthogonal frequency division multiplexing (OFDM) symbols. Please refer to FIG. 2a again. The comb resource is divided into the two code division multiplexing (CDM) groups, namely the first code division multiplexing (CDM) group and the second code division multiplexing (CDM) group respectively. A resource of the first code division multiplexing (CDM) group is set in a second orthogonal frequency division multiplexing (OFDM) symbol, and the corresponding subcarriers are the first, third, fifth, seventh, ninth and eleventh subcarriers respectively. A resource of the second code division multiplexing (CDM) group is set in the second orthogonal frequency division multiplexing (OFDM) symbol, and the corresponding subcarriers are the second, fourth, sixth, eighth, tenth and twelfth subcarriers respectively.

In one example, the frequency band in the code division multiplexing (CDM) group may be set according to a signal reception quality when the demodulation reference signal (DMRS) is sent on the frequency band. For example, the receiving end demands that the signal reception quality of the demodulation reference signals (DMRSs) sent on the frequency band of the first code division multiplexing (CDM) group is higher than that of the demodulation reference signals (DMRSs) sent on the frequency band contained in the second code division multiplexing (CDM) group. Then the frequency band in the first code division multiplexing (CDM) group is set as a first frequency band, and the frequency band in the second code division multiplexing (CDM) group is set as a second frequency band, where the signal reception quality of the demodulation reference signal (DMRSs) sent by the first frequency band in a wireless communication environment is greater than that of the demodulation reference signals (DMRSs) sent by the second frequency band in the wireless communication environment.

In one example, neither the demodulation reference signal (DMRS) nor user face data and/or control face data are transmitted on the frequency band of the second code division multiplexing (CDM) group. Thus, since there is no data transmission on some subcarriers in the frequency domain, when the demodulation reference signals (DMRSs) received by the receiving end is transformed to the time domain, the pilot sequence will repeat, that is, the plurality of equivalent pilot sequences will appear. In this way, the receiving end may perform channel estimation by utilizing the plurality of equivalent pilot sequences.

In one example, the comb resource contained in the first code division multiplexing (CDM) group is determined according to the frequency domain resource distribution density of the comb resource. For example, there are totally twelve consecutive subcarriers. In response to determining that the frequency domain resource distribution density is ½, the first code division multiplexing (CDM) group may include the first, third, fifth, seventh, ninth and eleventh sub carriers.

In one example, the frequency domain resource distribution density of the comb resource is determined according to the number of times of superposing needed by the pilot sequences. In one example, the number of times of superposing is greater than a number-of-times threshold, and the frequency domain resource distribution density is set to be smaller than a density threshold. Here, the frequency domain resource distribution density may be flexibly adjusted according to the number of times of superposing, so that the obtained channel estimation result better meets channel estimation demands under different channel estimation environments. Here, the larger the number of times of superposing is, the greater the pilot signal energy will be, and the more accurate the channel estimation result will be.

In one example, please refer to FIG. 8a and FIG. 8b. The frequency domain resource distribution density of the comb resource is ¼, the number of repeat times of the pilot sequences is 4, and thus superposing may be performed for 4 times. Here, the comb resource shown in FIG. 8a is used to send a single-symbol demodulation reference signal (DMRS). The comb resource shown in FIG. 8b is used to send a double-symbol demodulation reference signal (DMRS).

In one example, please refer to FIG. 9a and FIG. 9b. The frequency domain resource distribution density of the comb resource is ⅙, and the number of repeat times of the pilot sequences is 6. Here, the comb resource shown in FIG. 9a is used to send the single-symbol demodulation reference signal (DMRS). The comb resource shown in FIG. 9b is used to send the double-symbol demodulation reference signal (DMRS).

In one example, please refer to FIG. 10a and FIG. 10b. The frequency domain resource distribution density of the comb resource is 1/12, the number of repeat times of the pilot sequences is 12, and thus superposing may be performed for 12 times. Here, the comb resource shown in FIG. 10a is used to send the single-symbol demodulation reference signal (DMRS). The comb resource shown in FIG. 10b is used to send the double-symbol demodulation reference signal (DMRS).

In one example, after a first code division multiplexing (CDM) group is determined, the remaining comb resources belong to the second code division multiplexing (CDM) groups. Here, there may be the plurality of second code division multiplexing (CDM) groups.

Figure 15:
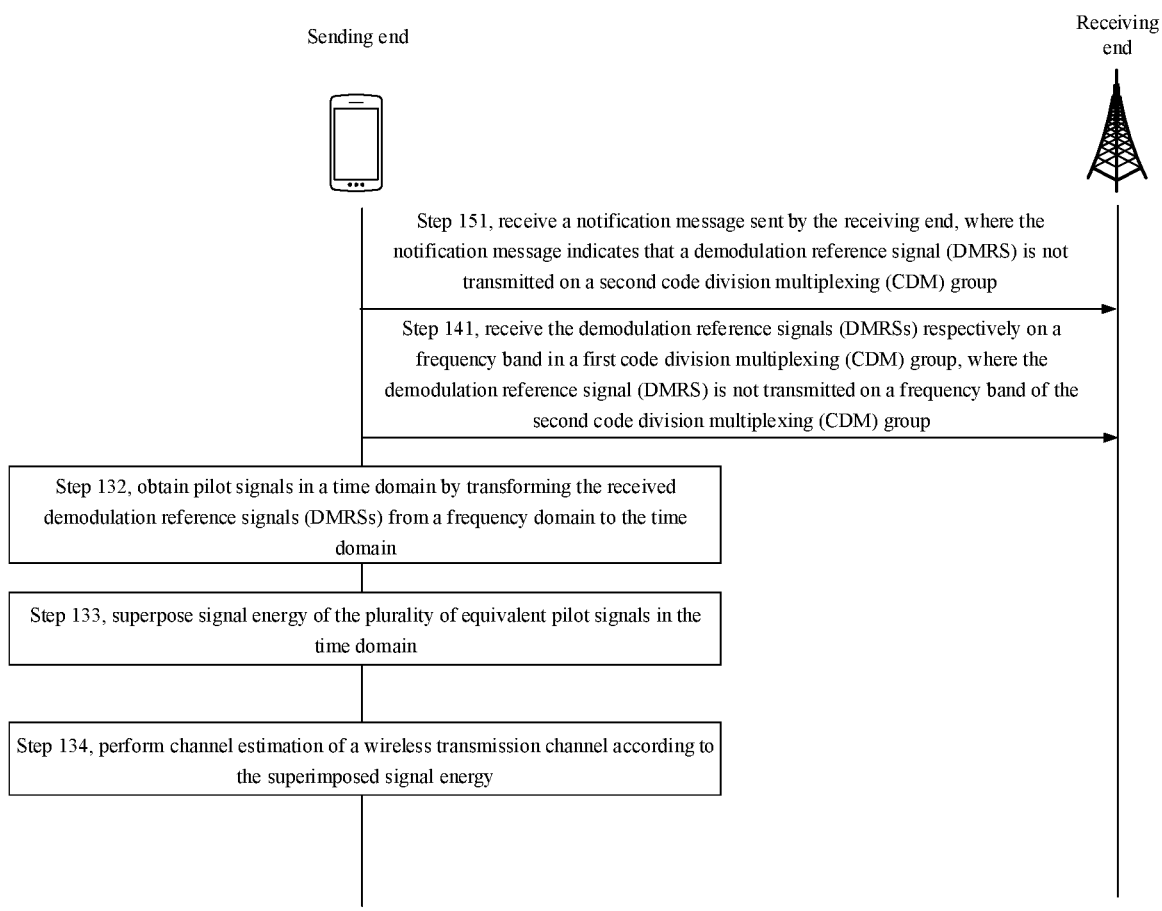
FIG. 15 is a flow diagram of a channel estimation method shown according to an example.

As shown in FIG. 15, the present example provides a channel estimation method, further including step 151 prior to steps 141, 132, 133, and 134.

In step 151, a notification message sent by a receiving end is received, where
the notification message indicates that a demodulation reference signal (DMRS) is not transmitted on a second code division multiplexing (CDM) group.

In one example, the notification message sent by the sending end may be received in response to establishment of a radio resource control (RRC) connection between the receiving end and a sending end. In this way, when receiving the demodulation reference signal (DMRS), the receiving end may demodulate a received signal based on the notification message.

In one example, after a first code division multiplexing (CDM) group is determined, the remaining comb resources belong to the second code division multiplexing (CDM) groups. After determining the second code division multiplexing (CDM) group, the sending end sends the notification message to the receiving end. In this way, when receiving the signal, the receiving end may determine, based on the notification message, that the demodulation reference signal (DMRS) is sent on a comb resource contained in the first code division multiplexing (CDM) group, and can demodulate a received signal based on the notification message.

Figure 16:
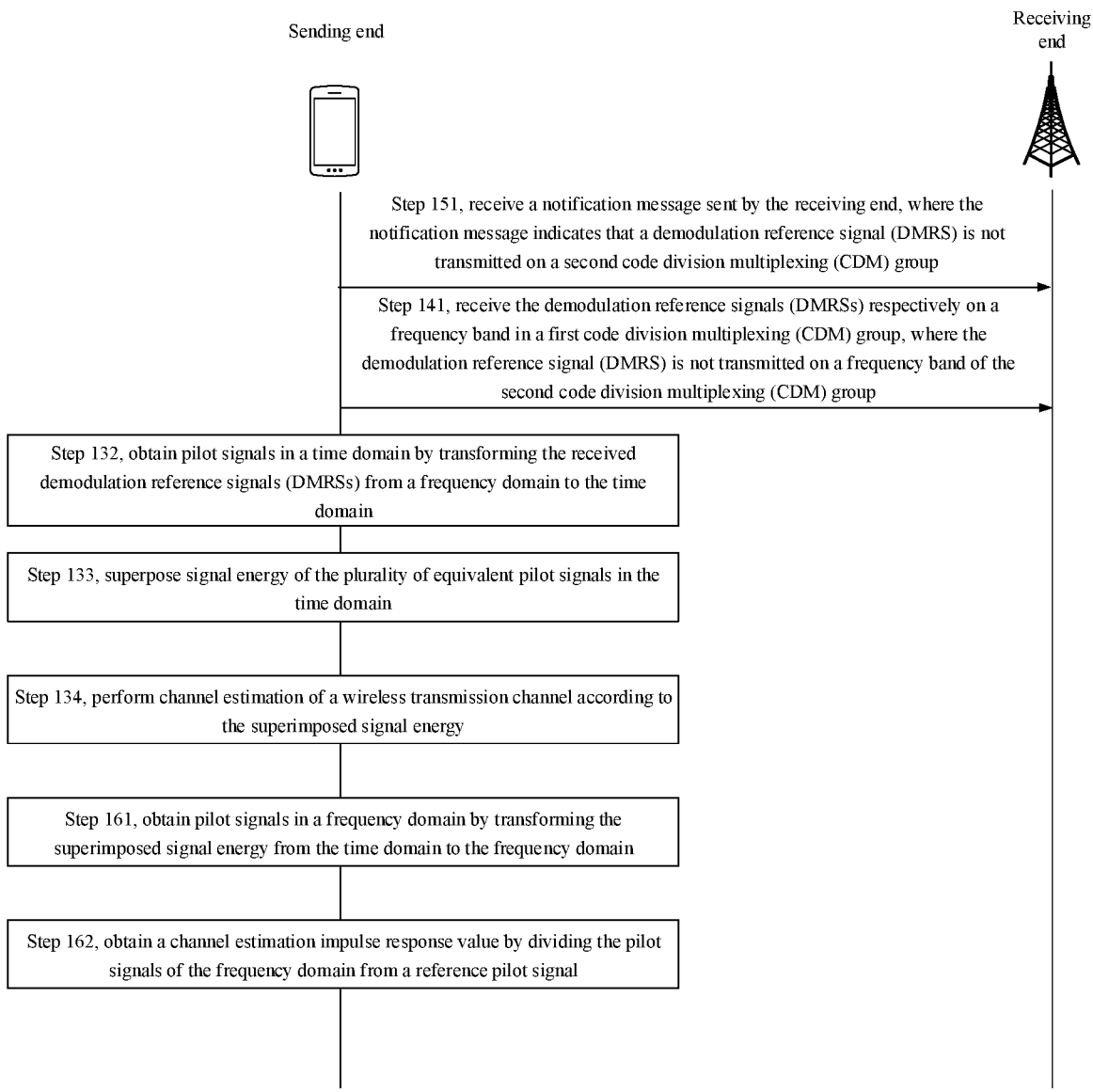
FIG. 16 is a flow diagram of a channel estimation method shown according to an example.

As shown in FIG. 16, the present example provides a channel estimation method. In step 134, performing channel estimation of the wireless transmission channel according to superposed signal energy includes steps 161 and 162.

In step 161, pilot signals in a frequency domain are obtained by transforming the superposed signal energy from a time domain to the frequency domain; and in step 162, a channel estimation impulse response value is obtained by dividing the pilot signals of the frequency domain from a reference pilot signal.

In one example, signal energy of a pilot sequence in a frequency domain may be obtained by performing fast Fourier transform (FFT) on the signal energy of the superposed pilot sequence.

In one example, the reference pilot signal may be a pilot sequence sent by the sending end and stored locally in advance.

In one example, the pilot sequence transformed to the frequency domain is divided by the locally stored pilot sequence to obtain a channel estimation impulse response H value. After noise suppression processing is performed on the obtained H value, a channel estimation value of the data part is obtained through an interpolation algorithm.

Figure 17:
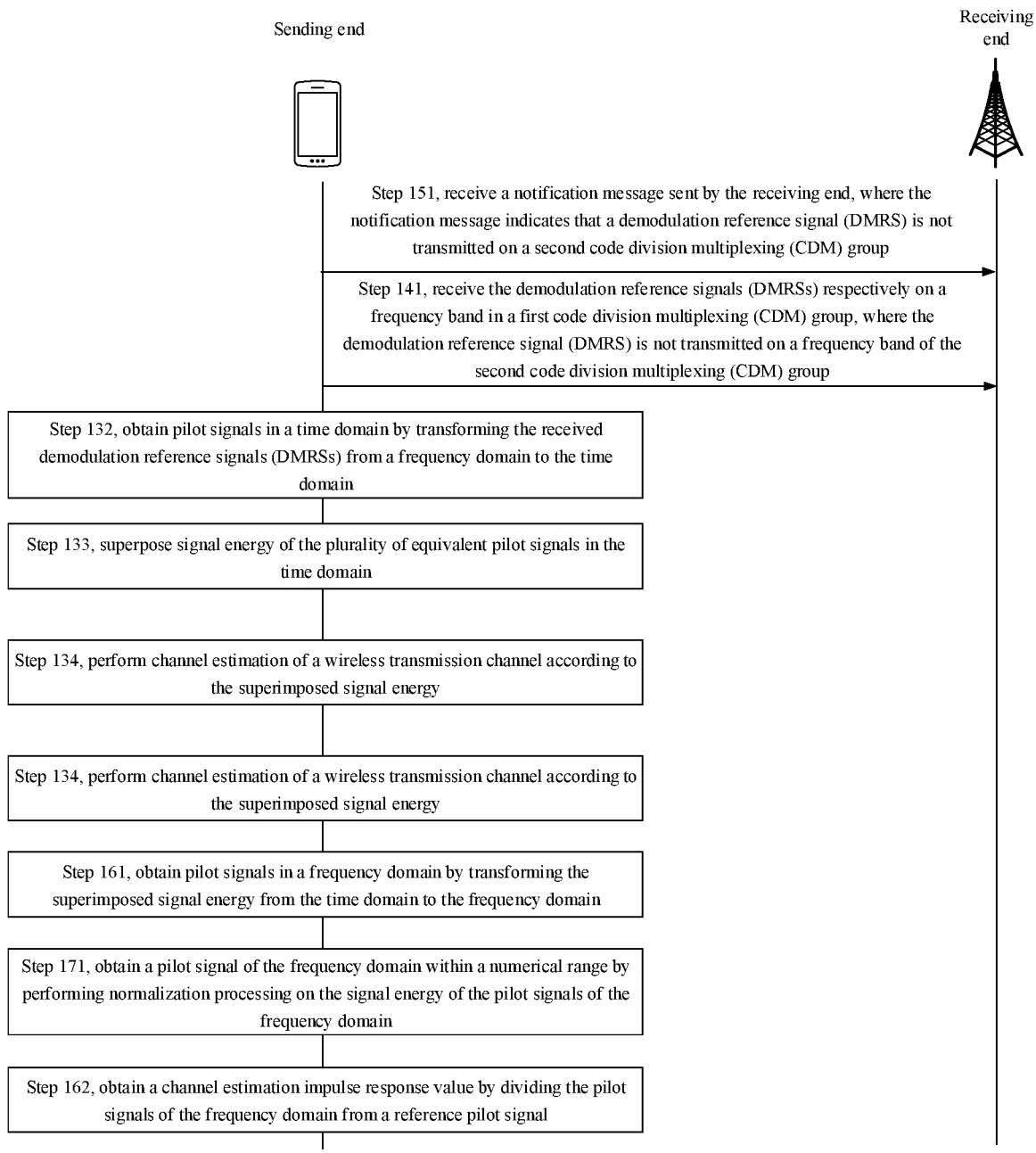
FIG. 17 is a flow diagram of a channel estimation method shown according to an example.

As shown in FIG. 17, the present example provides a channel estimation method. In step 132, before obtaining a channel estimation impulse response value by dividing pilot signals of a frequency domain from a reference pilot signal, the method further includes step 171, a pilot signal of the frequency domain within a numerical range is obtained by performing normalization processing on the signal energy of the pilot signals of the frequency domain.

In one example, the numerical range may be predetermined.

In one example, a time domain location, a frequency domain location and/or the quantity of a frequency band in a first code division multiplexing (CDM) group are/is determined according to a mapping mode of demodulation reference signals (DMRSs).

In one example, the time domain location, the frequency domain location and/or the quantity of the frequency band may be a time domain location, a frequency domain location and/or the quantity of a resource element (RE).

In one example, different mapping modes map the demodulation reference signals (DMRSs) to the different time domain locations and frequency domain locations for transmission.

In one example, the mapping mode of the demodulation reference signals (DMRSs) may directly indicate a time domain location, a frequency domain location and/or the quantity of a frequency band in the first code division multiplexing (CDM) group. For example, the mapping mode of the demodulation reference signals (DMRSs) may directly indicate that in the first code division multiplexing (CDM) group, the time domain location is a location of a second symbol, the frequency domain location is locations of first, third, fifth, seventh, ninth, and eleventh subcarriers, and the quantity is six.

In one example, the mapping mode of the demodulation reference signals (DMRSs) may directly indicate a frequency domain resource distribution density of the comb resource in the first code division multiplexing (CDM) group. A receiving end may determine the time domain location, the frequency domain location and/or the quantity of the frequency band in the first code division multiplexing (CDM) group according to the frequency domain resource distribution density.

In one example, the time domain location, the frequency domain location and/or the quantity of the frequency band in the first code division multiplexing (CDM) group have a one-to-one corresponding mapping relationship with the frequency domain resource distribution density. For example, in response to determining that the frequency domain resource distribution density is a first frequency domain resource distribution density, the time domain location of the frequency band in the first code division multiplexing (CDM) group is a first time domain location, the frequency domain location is a first frequency domain location, and the quantity is N. Here, N is a positive integer.

In one example, the mapping mode at least indicates the frequency domain resource distribution density of the comb resource; and the different mapping modes correspond to the different frequency domain resource distribution densities.

In one example, please refer to FIG. 8a and FIG. 8b again, which show a first mapping mode, and the frequency domain resource distribution density of the comb resource indicated by the first mapping mode is ¼. Here, the first mapping mode shown in FIG. 8a is used to send a single-symbol demodulation reference signal (DMRS). The first mapping mode shown in FIG. 8b is used to send a double-symbol demodulation reference signal (DMRS).

In one example, please refer to FIG. 9a and FIG. 9b again, which show a second mapping mode, and the frequency domain resource distribution density of the comb resource indicated by the second mapping mode is ⅙. Here, the second mapping mode shown in FIG. 9a is used to send the single-symbol demodulation reference signal (DMRS). The second mapping mode shown in FIG. 9b is used to send the double-symbol demodulation reference signal (DMRS).

In one example, please refer to FIG. 10a and FIG. 10b again, which show a third mapping mode, and the frequency domain resource distribution density of the comb resource indicated by the third mapping mode is 1/12. Here, the third mapping mode shown in FIG. 10a is used to send the single-symbol demodulation reference signal (DMRS). The third mapping mode shown in FIG. 10b is used to send the double-symbol demodulation reference signal (DMRS).

In one example, the frequency domain resource distribution density of the comb resource is determined according to the number of times of superposing needed by the pilot sequences. In one example, the number of times of superposing is greater than a number-of-times threshold, and the frequency domain resource distribution density is set to be smaller than a density threshold. Here, the larger the number of times of superposing is, the greater the pilot signal energy will be, and the more accurate the channel estimation result will be.

In one example, the number of times of superposing is negatively correlated with the frequency domain resource distribution density. For example, in response to determining that the number of times of superposing is N, the frequency domain resource distribution density is 1/N.

Figure 18:
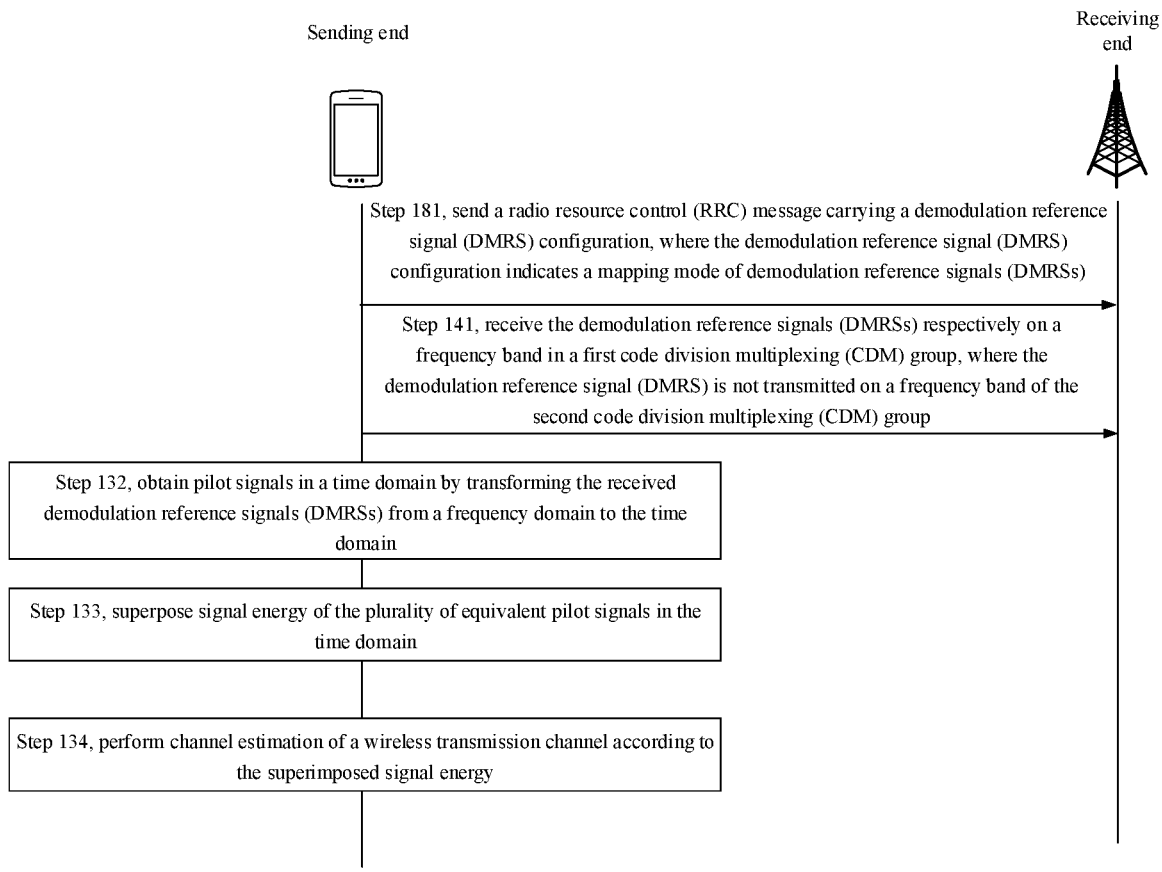
FIG. 18 is a flow diagram of a channel estimation method shown according to an example.

As shown in FIG. 18, the present example provides a channel estimation method, further including step 181 before step 141.

In step 181, a radio resource control (RRC) message carrying a demodulation reference signal (DMRS) configuration is sent, where the demodulation reference signal (DMRS) configuration indicates a mapping mode of demodulation reference signals (DMRSs).

In one example, the carried demodulation reference signal (DMRS) configuration is sent by utilizing a radio resource control (RRC) message so as to improve the compatibility of the radio resource control (RRC) message.

In one example, the radio resource control (RRC) message carrying the demodulation reference signal (DMRS) configuration may be sent when a sending end and a receiving end establish a radio resource control (RRC) connection.

Figure 19:
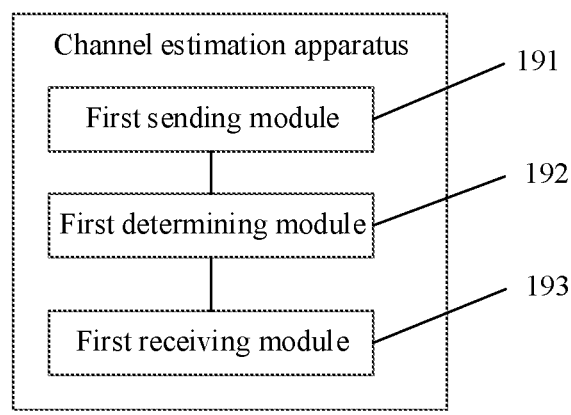
FIG. 19 is a schematic diagram of a channel estimation apparatus shown according to an example.

As shown in FIG. 19, the present example provides a channel estimation apparatus 190, applied by a sending end, and including a first sending module 191, where the first sending module 191 is configured to send demodulation reference signals (DMRSs) on a comb resource. After the demodulation reference signals (DMRSs) transmitted on different frequency bands of the comb resource are transformed to a time domain, pilot sequences that are equivalent are obtained; and signal energy of the plurality of equivalent pilot sequences is superposed, and is then used for channel estimation of a wireless transmission channel.

In one example, the comb resource corresponds to a first code division multiplexing (CDM) group and a second code division multiplexing (CDM) group, and the first code division multiplexing (CDM) group and the second code division multiplexing (CDM) group contain different frequency bands.

The first sending module 191 is further configured to: send the demodulation reference signals (DMRSs) on the frequency band in the first code division multiplexing (CDM) group, where the demodulation reference signal (DMRS) is not transmitted on the frequency band of the second code division multiplexing (CDM) group.

In one example, the first sending module 191 is further configured to: send a notification message to a receiving end, where the notification message indicates that the demodulation reference signal (DMRS) is not transmitted on the second code division multiplexing (CDM) group.

In one example, the apparatus 190 further includes a first determining module 192, and the first determining module 192 is further configured to: determine a time domain location, a frequency domain location and/or the quantity of the frequency band in the first code division multiplexing (CDM) group according to a mapping mode of the demodulation reference signals (DMRSs).

In one example, the mapping mode at least indicates a frequency domain resource distribution density of the comb resource; and the different mapping modes correspond to the different frequency domain resource distribution densities.

In one example, the frequency domain resource distribution density of the comb resource is determined according to the number of times of superposing needed by the pilot sequences.

In one example, the number of times of superposing is negatively correlated with the frequency domain resource distribution density.

In one example, the apparatus 190 further includes a first receiving module 193, and the first receiving module 193 is configured to: receive a radio resource control (RRC) message carrying a demodulation reference signal (DMRS) configuration is received, where the demodulation reference signal (DMRS) configuration at least indicates the mapping mode of the demodulation reference signals (DMRSs); and the first determining module 192 is further configured to: determine the mapping mode of the demodulation reference signals (DMRSs) according to the demodulation reference signal (DMRS) configuration.

Figure 20:
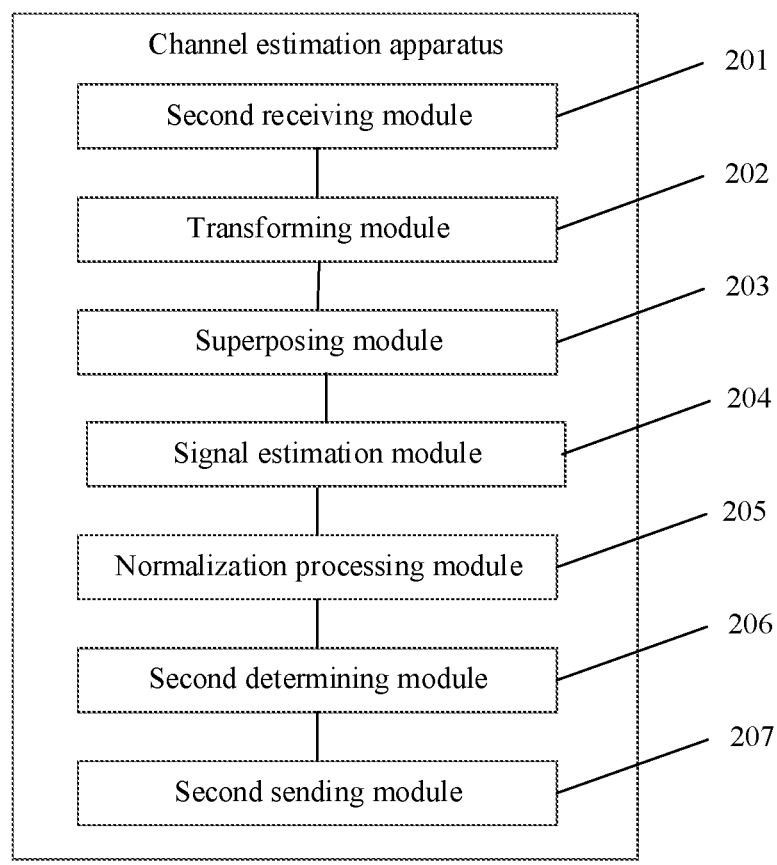
FIG. 20 is a schematic diagram of a channel estimation apparatus shown according to an example.

As shown in FIG. 20, the present example provides a channel estimation apparatus 200, applied by a receiving end, and including a second receiving module 201, a transforming module 202, a superposing module 203 and a channel estimation module 204.

The second receiving module 201 is configured to: receive demodulation reference signals (DMRSs) respectively on different frequency bands of a comb resource.

The transforming module 202 is configured to: obtain pilot signals in a time domain by transforming the received demodulation reference signals (DMRSs) from a frequency domain to the time domain.

The superposing module 203 is configured to: superpose signal energy of the plurality of equivalent pilot signals in the time domain.

The channel estimation module 204 is configured to: perform channel estimation of a wireless transmission channel according to the superposed signal energy.

In one example, the comb resource corresponds to a first code division multiplexing (CDM) group and a second code division multiplexing (CDM) group, and the first code division multiplexing (CDM) group and the second code division multiplexing (CDM) group contain different frequency bands.

The second receiving module 201 is further configured to: receive the demodulation reference signals (DMRSs) respectively on the frequency band in the first code division multiplexing (CDM) group, where the demodulation reference signal (DMRS) is not transmitted on the frequency band of the second code division multiplexing (CDM) group.

In one example, the second receiving module 201 is further configured to: receive a notification message sent by the receiving end, where the notification message indicates that the demodulation reference signal (DMRS) is not transmitted on the second code division multiplexing (CDM) group.

In one example, the channel estimation module 204 is further configured to: obtain pilot signals in the frequency domain by transforming the superposed signal energy from the time domain to the frequency domain; and obtain a channel estimation impulse response value by dividing the pilot signals of the frequency domain from a reference pilot signal.

In one example, the apparatus 200 further includes a normalization processing module 205.

The normalization processing module 205 is configured to: obtain a pilot signal of the frequency domain within a numerical range by performing normalization processing on the signal energy of the pilot signals of the frequency domain.

In one example, a time domain location, a frequency domain location and/or the quantity of the frequency band in the first code division multiplexing (CDM) group are/is determined according to a mapping mode of the demodulation reference signals (DMRSs).

In one example, is further configured to: the mapping mode at least indicates a frequency domain resource distribution density of the comb resource; and the different mapping modes correspond to the different frequency domain resource distribution densities.

In one example, the frequency domain resource distribution density of the comb resource is determined according to the number of times of superposing needed by the pilot sequences.

In one example, the number of times of superposing is negatively correlated with the frequency domain resource distribution density.

In one example, the apparatus 200 further includes a second sending module 207, and the second sending module 207 is configured to: send a radio resource control (RRC) message carrying a demodulation reference signal (DMRS) configuration, where the demodulation reference signal (DMRS) configuration indicates the mapping mode of the demodulation reference signals (DMRSs).

As for the apparatus in the above examples, the specific modes for executing operations by all the modules have be described in the examples related to the method in detail, which is not illustrated in detail here.

An example of the disclosure provides a communication device, including: a processor; and a memory for storing executable instructions of the processor; where the processor is configured to: implement the method applied to any example of the disclosure when running the executable instructions.

The processor may include various types of storage media, which are non-transitory computer storage media that can continue to memorize information stored on them after the communication device is powered down.

The processor may be connected with the memory through a bus or the like and configured to read an executable program stored on the memory.

An example of the disclosure further provides a computer storage medium. The computer storage medium stores a computer executable program. The executable program, when executed by a processor, implements the method according to any example of the disclosure.

As for the apparatus in the above examples, the specific modes for executing operations by all the modules have be described in the examples related to the method in detail, which is not illustrated in detail here.

Figure 21:
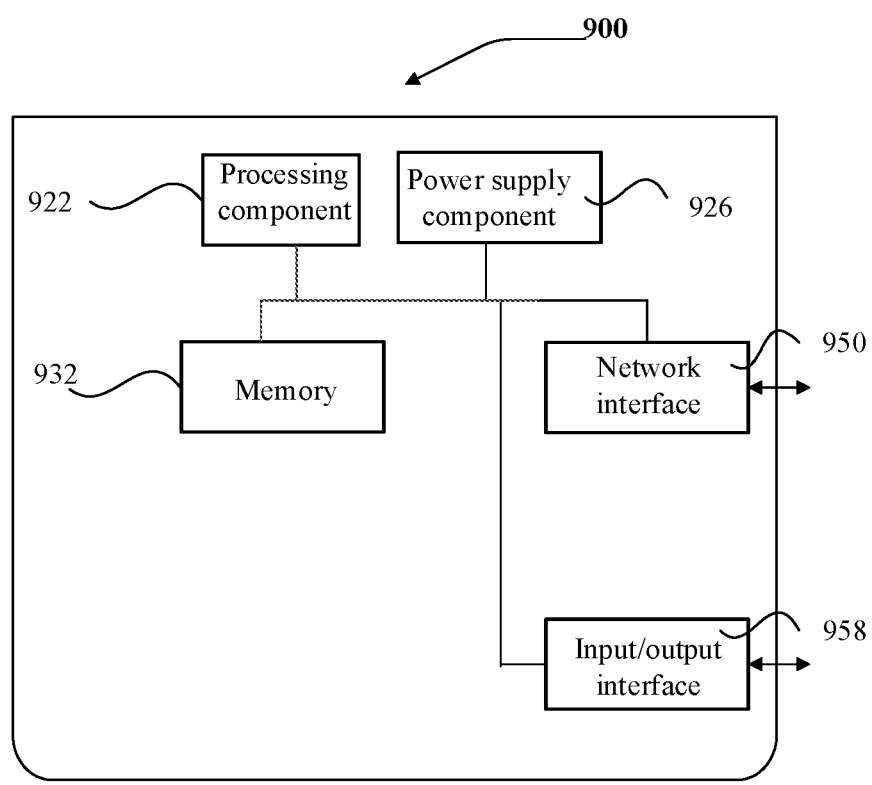
FIG. 21 is a block diagram of a base station shown according to an example.

As shown in FIG. 21, an example of the disclosure shows a structure of a base station. For example, the base station 900 may be provided as a network-side device. Referring to FIG. 21, the base station 900 includes a processing component 922, which further includes one or more processors, and a memory resource represented by a memory 932, for storing instructions executable by the processing component 922, such as an application program. The application program stored in the memory 932 may include one or more modules with each corresponding to a set of instructions. In addition, the processing component 922 is configured to execute the instructions so as to execute any of the aforementioned methods applied to the base station.

The base station 900 may further include a power supply component 926 configured to execute power supply management of the base station 900, a wired or wireless network interface 950 configured to connect the base station 900 to a network, and an input/output (I/O) interface 958. The base station 900 may operate based on an operating system stored in a memory 932, such as Windows Server™, Mac OS X™, Unix™, Linux™, FreeBSD™ or the like.

Those of skill in the art will easily figure out other implementation solutions of the disclosure after considering the specification and practicing the invention disclosed here. The disclosure intends to cover any transformation, usage or adaptive change of the disclosure, and these transformations, usages or adaptive changes conform to a general principle of the disclosure and include common general knowledge or conventional technical means which are not disclosed here in the technical field. The specification and the examples are merely regarded as an example, and the true scope and spirit of the disclosure are indicated by the following claims.

It will be appreciated that the disclosure is not limited to the exact construction that has been described above and shown in the accompanying drawings, and that various modifications and changes may be made without departing from its scope. The scope of the disclosure is limited merely by the appended claim.

What is claimed is:

1. A channel estimation method, applied by a sending end, and comprising:
    sending demodulation reference signals (DMRSs) on a comb resource, wherein
    after the DMRSs transmitted on different frequency bands of the comb resource are transformed to a time domain, pilot sequences that are equivalent are obtained; a superposed signal energy is obtained by superposing signal energy of the plurality of equivalent pilot signals in the time domain, and the superposed signal energy is used for channel estimation of a wireless transmission channel.

2. The channel estimation method according to claim 1, wherein the comb resource corresponds to a first code division multiplexing (CDM) group and at least one second CDM group; wherein the first CDM group and the second CDM group comprise different frequency bands; and
    sending the demodulation reference signals (DMRSs) on the comb resource comprises:

sending the DMRSs on the frequency band in the first CDM group, wherein the DMRS is not transmitted on the frequency band of the second CDM group.

3. The channel estimation method according to claim 2, further comprising:
sending a notification message to a receiving end, wherein the notification message indicates that the DMRS is not transmitted on the second CDM group.

4. The channel estimation method according to claim 2, further comprising:
determining at least of one the following, according to a mapping mode of the DMRS:
a time domain location of the frequency band in the first CDM group;
a frequency domain location of the frequency band in the first CDM group; and
the quantity of the frequency band in the first CDM group.

5. The channel estimation method according to claim 4, wherein the mapping mode at least indicates a frequency domain resource distribution density of the comb resource; and the different mapping modes correspond to the different frequency domain resource distribution densities.

6. The channel estimation method according to claim 5, wherein the frequency domain resource distribution density of the comb resource is determined according to the number of times of superposing needed by the pilot sequences.

7. The channel estimation method according to claim 6, wherein the number of times of superposing is negatively correlated with the frequency domain resource distribution density.

8. The channel estimation method according to claim 4, further comprising:
receiving a radio resource control (RRC) message carrying a DMRS configuration, wherein the DMRS configuration at least indicates the mapping mode of the DMRSs; and
determining the mapping mode of the DMRSs according to the DMRS configuration.

9. A channel estimation method, applied by a receiving end, and comprising:
receiving DMRSs respectively on different frequency bands of a comb resource;
obtaining pilot signals in a time domain by transforming the received DMRSs from a frequency domain to the time domain;
obtaining a superposed signal energy by superposing signal energy of the plurality of equivalent pilot signals in the time domain; and
performing channel estimation of a wireless transmission channel according to the superposed signal energy.

10. The channel estimation method according to claim 9, wherein the comb resource corresponds to a first code division multiplexing (CDM) group and at least one second CDM group; wherein the first CDM group and the second CDM group comprise different frequency bands; and
receiving the DMRSs respectively on the different frequency bands of the comb resource comprises:
receiving the DMRSs respectively on the frequency band in the first CDM group, wherein the DMRS is not transmitted on the frequency band of the second CDM group.

11. The channel estimation method according to claim 10, further comprising:
receiving a notification message sent by the receiving end, wherein the notification message indicates that the DMRS is not transmitted on the second CDM group.

12. The channel estimation method according to claim 9, wherein performing channel estimation of the wireless transmission channel according to the superposed signal energy comprises:
obtaining pilot signals in the frequency domain by transforming the superposed signal energy from the time domain to the frequency domain; and
obtaining a channel estimation impulse response value by dividing the pilot signals of the frequency domain from a reference pilot signal.

13. The channel estimation method according to claim 12, wherein before obtaining the channel estimation impulse response value by dividing the pilot signals of the frequency domain from the reference pilot signal, the method further comprises:
obtaining a pilot signal of the frequency domain within a numerical range by performing normalization processing on the signal energy of the pilot signals of the frequency domain.

14. The channel estimation method according to claim 10, wherein a time domain location, a frequency domain location and/or the quantity of the frequency band in the first CDM group are/is determined according to a mapping mode of the DMRSs.

15. The channel estimation method according to claim 14, wherein the mapping mode at least indicates a frequency domain resource distribution density of the comb resource; and the different mapping modes correspond to the different frequency domain resource distribution densities.

16. The channel estimation method according to claim 15, wherein the frequency domain resource distribution density of the comb resource is determined according to the number of times of superposing needed by the pilot sequences.

17. The channel estimation method according to claim 16, wherein the number of times of superposing is negatively correlated with the frequency domain resource distribution density.

18. The channel estimation method according to claim 14, further comprising:
sending a radio resource control (RRC) message carrying a DMRS configuration, wherein the DMRS configuration indicates the mapping mode of the DMRSs.

19. A communication device, comprising:
an antenna;
a memory; and
a processor, connected with the antenna and the memory respectively, and configured to control transceiving of the antenna by executing computer-executable instructions stored on the memory, and the processor is further configured to execute the computer-executable instructions to:
send demodulation reference signals (DMRSs) on a comb resource, wherein
after the DMRSs transmitted on different frequency bands of the comb resource are transformed to a time domain, pilot sequences that are equivalent are obtained; and signal energy of the plurality of equivalent pilot sequences is superposed, and is then used for channel estimation of a wireless transmission channel.

20. A communication device, comprising:
an antenna;
a memory; and
a processor, connected with the antenna and the memory respectively, and configured to control transceiving of the antenna by executing computer-executable instructions stored on the memory, and be able to implement the channel estimation method provided by claim 9.

\* \* \* \* \*

UNITED STATES PATENT AND TRADEMARK OFFICE
CERTIFICATE OF CORRECTION

PATENT NO. : 12,425,272 B2
APPLICATION NO. : 18/025096
DATED : September 23, 2025
INVENTOR(S) : Yuanyuan Li Page 1 of 1

It is certified that error appears in the above-identified patent and that said Letters Patent is hereby corrected as shown below:

In the Specification
In Column 4, Line 60, delete "public" and insert -- packet --, therefor.
In Column 5, Line 47, delete "orthogonal" and insert -- orthogonal cover --, therefor.
In Column 6, Line 39, delete "3th" and insert -- 3rd --, therefor.
In Column 8, Line 63, delete "domain is." and insert -- domain. --, therefor.
In Column 11, Lines 55-56, delete "sub carriers." and insert -- subcarriers. --, therefor.
In Column 13, Line 1, delete "at least of one" and insert -- at least one of --, therefor.
In Column 15, Lines 25-26, delete "superposed" and insert -- superimposed --, therefor.
In Column 15, Line 39, delete "3th" and insert -- 3rd --, therefor.
In Column 17, Line 63, delete "domain is." and insert -- domain. --, therefor.
In Column 20, Lines 41-42, delete "sub carriers." and insert -- subcarriers. --, therefor.
In Column 21, Line 50, delete "superposed" and insert -- superimposed --, therefor.
In Column 21, Line 52, delete "superposed" and insert -- superimposed --, therefor.
In Column 25, Line 50, delete "have be" and insert -- have been --, therefor.
In Column 25, Line 65, delete "stored on" and insert -- stored in --, therefor.
In Column 26, Line 5, delete "have be" and insert -- have been --, therefor.

In the Claims
In Column 27, Line 12, in Claim 4, delete "at least of one" and insert -- at least one of --, therefor.

Signed and Sealed this
Ninth Day of December, 2025

John A. Squires
*Director of the United States Patent and Trademark Office*